(12) United States Patent
Kameoka et al.

(10) Patent No.: US 12,051,433 B2
(45) Date of Patent: Jul. 30, 2024

(54) CONVERSION LEARNING APPARATUS, CONVERSION LEARNING METHOD, CONVERSION LEARNING PROGRAM AND CONVERSION APPARATUS

(71) Applicant: NIPPON TELEGRAPH AND TELEPHONE CORPORATION, Tokyo (JP)

(72) Inventors: Hirokazu Kameoka, Musashino (JP); Ko Tanaka, Musashino (JP); Takuhiro Kaneko, Musashino (JP); Nobukatsu Hojo, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/794,227

(22) PCT Filed: Jan. 30, 2020

(86) PCT No.: PCT/JP2020/003528
§ 371 (c)(1),
(2) Date: Jul. 20, 2022

(87) PCT Pub. No.: WO2021/152792
PCT Pub. Date: Aug. 5, 2021

(65) Prior Publication Data
US 2023/0138232 A1 May 4, 2023

(51) Int. Cl.
*G10L 21/007* (2013.01)
*G06F 17/16* (2006.01)
(Continued)

(52) U.S. Cl.
CPC .......... *G10L 21/007* (2013.01); *G06F 17/16* (2013.01); *G06N 20/20* (2019.01); *G10L 25/30* (2013.01)

(58) Field of Classification Search
CPC .......... G10L 21/007; G10L 25/30; G10L 2021/0135; G06F 17/16; G06F 17/18;
(Continued)

(56) References Cited

U.S. PATENT DOCUMENTS

2010/0017197 A1* 1/2010 Oshikiri .......... G10L 19/0204 704/219
2018/0047389 A1* 2/2018 Song .............. G10L 15/16
(Continued)

FOREIGN PATENT DOCUMENTS

WO WO-2019182059 A1 9/2019

OTHER PUBLICATIONS

Kameoka et al "Stargan-VC: Non-parallel many-to-many . . . Networks" Published in: 2018 IEEE Spoken Language Technology Workshop (SLT); Dec. 18-21, 2018; Electronic ISBN:978-1-5386-4334-1 USB ISBN:978-1-5386-4333-4; (Year: 2018).*
(Continued)

*Primary Examiner* — Michael N Opsasnick
(74) *Attorney, Agent, or Firm* — Harness, Dickey & Pierce, P.L.C.

(57) ABSTRACT

A conversion learning device includes: a source encoding unit that converts, by using a first machine learning model, a feature amount sequence of a source domain that is a characteristic of conversion-source content data, into a first internal representation vector sequence that is a matrix in which internal representation vectors at individual locations of the feature amount sequence of the source domain are arranged; a target encoding unit that converts, by using a second machine learning model, a feature amount sequence of a target domain that is a characteristic of conversion-target content data, into a second internal representation vector sequence that is a matrix in which internal represen-
(Continued)

tation vectors at individual locations of the feature amount sequence of the target domain are arranged; an attention matrix calculation unit that calculates, by using the first internal representation vector sequence and the second internal representation vector sequence, an attention matrix that is a matrix mapping the individual locations of the feature amount sequence of the source domain to the individual locations of the feature amount sequence of the target domain, and calculates a third internal representation vector sequence that is a product of an internal representation vector sequence calculated by linear conversion of the first internal representation vector sequence and the attention matrix; a target decoding unit that calculates, by using the third internal representation vector sequence, a feature amount sequence of a conversion domain that is used to convert the source domain into the conversion domain, by using a third machine learning model; and a learning execution unit that causes at least one of the target encoding unit and the target decoding unit to learn such that a distance between a submatrix of the feature amount sequence of the target domain and a submatrix of the feature amount sequence of the conversion domain becomes shorter.

8 Claims, 16 Drawing Sheets

(51) Int. Cl.
  *G06N 20/20* (2019.01)
  *G10L 25/30* (2013.01)

(58) Field of Classification Search
  CPC .......... G06N 20/20; G06N 3/045; G06N 3/08; G06N 3/084; G06N 3/088
  See application file for complete search history.

(56) References Cited

U.S. PATENT DOCUMENTS

| | | | |
|---|---|---|---|
| 2018/0203852 A1* | 7/2018 | Goyal | G06F 40/56 |
| 2018/0261214 A1* | 9/2018 | Gehring | G06N 3/04 |
| 2019/0244603 A1* | 8/2019 | Angkititrakul | G10L 15/16 |

OTHER PUBLICATIONS

Tanaka et al., "ATTS2S-VC: Sequence-to-sequence . . . Mechanisms", ICASSP 2019—2019 IEEE International Conference on Acoustics, Speech and Signal Processing (ICASSP); May 12-17, 2019; Electronic ISBN:978-1-4799-8131-1 (Year: 2018).*
Hiroyuki Miyoshi et al., Voice Conversion Using Sequence-to-Sequence Learning of Context Posterior Probabilities, Interspeech, 2017, Aug. 20, 2017, pp. 1268-1272.
Jing-Xuan Zhang et al., Sequence-to-Sequence Acoustic Modeling for Voice Conversion, arXiv, Oct. 16, 2018.
Fadi Biadsy et al., Parrotron: An End-to-End Speech-to-Speech Conversion Model and its Applications to Hearing-Impaired Speech and Speech Separation, Interspeech, 2019, Sep. 15, 2019, pp. 4115-4119.
Kou Tanaka et al., Sequence-to-Sequence Voice Conversion Using Context Preservation Mechanism, IEICE Technical Report, vol. 119, No. 188, 2019, pp. 7-12.

\* cited by examiner

Fig. 7

| SPEAKER ID | | WITHOUT FORWARD ATTENTION CORRECTION | WITH FORWARD ATTENTION CORRECTION |
| --- | --- | --- | --- |
| SOURCE | TARGET | | |
| clb | bdl | 6.26 ± 0.09 | 6.28 ± 0.09 |
| | slt | 5.83 ± 0.08 | 5.76 ± 0.05 |
| | rms | 6.30 ± 0.09 | 6.27 ± 0.10 |
| bdl | clb | 6.11 ± 0.18 | 6.00 ± 0.11 |
| | slt | 5.97 ± 0.08 | 5.97 ± 0.09 |
| | rms | 6.68 ± 0.11 | 6.39 ± 0.12 |
| slt | clb | 5.82 ± 0.08 | 5.83 ± 0.08 |
| | bdl | 6.58 ± 0.19 | 6.52 ± 0.16 |
| | rms | 6.56 ± 0.08 | 6.41 ± 0.07 |
| rms | clb | 6.14 ± 0.14 | 6.24 ± 0.18 |
| | bdl | 6.95 ± 0.12 | 6.75 ± 0.10 |
| | slt | 6.25 ± 0.14 | 6.15 ± 0.13 |
| AVERAGE OF ALL PAIRS | | 6.29 ± 0.05 | 6.21 ± 0.04 |

Fig. 13

| SPEAKER ID | | Multi-domain | |
|---|---|---|---|
| SOURCE | TARGET | ONE-TO-ONE CONVERSION | MANY-TO-ONE CONVERSION |
| clb | bdl | 6.04 ± 0.12 | 6.13 ± 0.16 |
| | slt | 5.60 ± 0.08 | 5.86 ± 0.11 |
| | rms | 6.01 ± 0.11 | 6.06 ± 0.16 |
| bdl | clb | 5.57 ± 0.07 | 5.78 ± 0.11 |
| | slt | 5.75 ± 0.06 | 6.17 ± 0.18 |
| | rms | 5.95 ± 0.09 | 6.46 ± 0.17 |
| slt | clb | 5.36 ± 0.06 | 5.64 ± 0.15 |
| | bdl | 6.07 ± 0.11 | 6.19 ± 0.12 |
| | rms | 5.98 ± 0.10 | 6.33 ± 0.14 |
| rms | clb | 5.62 ± 0.15 | 5.84 ± 0.20 |
| | bdl | 6.17 ± 0.10 | 6.37 ± 0.10 |
| | slt | 5.79 ± 0.09 | 6.00 ± 0.11 |
| AVERAGE OF ALL PAIRS | | 5.82 ± 0.04 | 6.07 ± 0.05 |

Fig. 14

| SPEAKER ID | | BATCH PROCESSING | REAL-TIME PROCESSING |
|---|---|---|---|
| SOURCE | TARGET | | |
| clb | bdl | 6.04 ± 0.12 | 6.25 ± 0.09 |
|  | slt | 5.60 ± 0.08 | 6.06 ± 0.07 |
|  | rms | 6.01 ± 0.11 | 6.01 ± 0.05 |
| bdl | clb | 5.57 ± 0.07 | 5.85 ± 0.12 |
|  | slt | 5.75 ± 0.06 | 6.17 ± 0.05 |
|  | rms | 5.95 ± 0.09 | 6.31 ± 0.17 |
| slt | clb | 5.36 ± 0.06 | 5.74 ± 0.07 |
|  | bdl | 6.07 ± 0.11 | 6.39 ± 0.12 |
|  | rms | 5.98 ± 0.10 | 6.08 ± 0.07 |
| rms | clb | 5.62 ± 0.15 | 6.16 ± 0.18 |
|  | bdl | 6.17 ± 0.10 | 6.65 ± 0.20 |
|  | slt | 5.79 ± 0.09 | 6.41 ± 0.14 |
| AVERAGE OF ALL PAIRS | | 5.82 ± 0.04 | 6.17 ± 0.04 |

Fig. 15

| SPEAKER ID | | FIRST EMBODIMENT | | | SECOND EMBODIMENT | | |
|---|---|---|---|---|---|---|---|
| SOURCE | TARGET | $\lambda_r = \lambda_o = 0$ | $\lambda_r \neq 0, \lambda_o = 0$ | $\lambda_r \neq 0, \lambda_o \neq 0$ | $\lambda_r = \lambda_o = 0$ | $\lambda_r \neq 0, \lambda_o = 0$ | $\lambda_r \neq 0, \lambda_o \neq 0$ |
| clb | bdl | 6.75 ± 0.15 | 6.41 ± 0.08 | 6.26 ± 0.09 | 6.39 ± 0.12 | 6.25 ± 0.10 | 6.04 ± 0.12 |
|  | slt | 6.17 ± 0.13 | 5.99 ± 0.08 | 5.83 ± 0.08 | 5.98 ± 0.12 | 5.91 ± 0.08 | 5.60 ± 0.08 |
|  | rms | 6.53 ± 0.11 | 6.53 ± 0.09 | 6.30 ± 0.09 | 6.23 ± 0.17 | 6.25 ± 0.10 | 6.01 ± 0.11 |
| bdl | clb | 6.44 ± 0.13 | 6.22 ± 0.06 | 6.11 ± 0.18 | 5.76 ± 0.08 | 5.98 ± 0.07 | 5.57 ± 0.07 |
|  | slt | 6.16 ± 0.09 | 6.24 ± 0.10 | 5.97 ± 0.08 | 6.15 ± 0.15 | 6.19 ± 0.07 | 5.75 ± 0.06 |
|  | rms | 6.78 ± 0.21 | 6.54 ± 0.10 | 6.68 ± 0.11 | 6.24 ± 0.19 | 6.37 ± 0.14 | 5.95 ± 0.09 |
| slt | clb | 6.33 ± 0.20 | 5.92 ± 0.07 | 5.82 ± 0.08 | 5.62 ± 0.06 | 5.70 ± 0.12 | 5.36 ± 0.06 |
|  | bdl | 6.81 ± 0.14 | 6.56 ± 0.11 | 6.58 ± 0.19 | 6.40 ± 0.14 | 6.38 ± 0.07 | 6.07 ± 0.11 |
|  | rms | 6.80 ± 0.14 | 6.55 ± 0.09 | 6.56 ± 0.08 | 6.24 ± 0.12 | 6.28 ± 0.13 | 5.98 ± 0.10 |
| rms | clb | 6.67 ± 0.10 | 6.47 ± 0.15 | 6.14 ± 0.14 | 5.84 ± 0.08 | 6.09 ± 0.18 | 5.62 ± 0.15 |
|  | bdl | 7.24 ± 0.15 | 6.72 ± 0.08 | 6.95 ± 0.12 | 6.45 ± 0.11 | 6.47 ± 0.09 | 6.17 ± 0.10 |
|  | slt | 6.73 ± 0.20 | 6.30 ± 0.17 | 6.25 ± 0.14 | 6.20 ± 0.21 | 6.22 ± 0.15 | 5.79 ± 0.09 |
| AVERAGE OF ALL PAIRS | | 6.62 ± 0.05 | 6.37 ± 0.04 | 6.29 ± 0.05 | 6.12 ± 0.05 | 6.17 ± 0.04 | 5.82 ± 0.04 |

Fig. 16

| SPEAKER ID | | SCHEME COMPARED | | METHOD OF THE INVENTION | |
|---|---|---|---|---|---|
| SOURCE | TARGET | sprocket | RNN-S2S | FIRST EMBODIMENT | SECOND EMBODIMENT |
| clb | bdl | 6.84 ± 0.04 | 6.37 ± 0.05 | 6.28 ± 0.09 | 6.04 ± 0.12 |
|  | slt | 6.39 ± 0.03 | 5.92 ± 0.05 | 5.76 ± 0.05 | 5.60 ± 0.08 |
|  | rms | 6.77 ± 0.03 | 6.27 ± 0.08 | 6.27 ± 0.10 | 6.01 ± 0.11 |
| bdl | clb | 6.31 ± 0.04 | 6.11 ± 0.07 | 6.00 ± 0.11 | 5.57 ± 0.07 |
|  | slt | 6.53 ± 0.03 | 6.09 ± 0.07 | 5.97 ± 0.09 | 5.75 ± 0.06 |
|  | rms | 7.28 ± 0.07 | 6.49 ± 0.07 | 6.39 ± 0.12 | 5.95 ± 0.09 |
| slt | clb | 6.15 ± 0.03 | 5.93 ± 0.08 | 5.83 ± 0.08 | 5.36 ± 0.06 |
|  | bdl | 6.80 ± 0.03 | 6.43 ± 0.05 | 6.52 ± 0.16 | 6.07 ± 0.11 |
|  | rms | 6.95 ± 0.05 | 6.24 ± 0.06 | 6.41 ± 0.07 | 5.98 ± 0.10 |
| rms | clb | 6.37 ± 0.03 | 6.17 ± 0.08 | 6.24 ± 0.18 | 5.62 ± 0.15 |
|  | bdl | 7.38 ± 0.07 | 6.52 ± 0.05 | 6.75 ± 0.10 | 6.17 ± 0.10 |
|  | slt | 6.87 ± 0.05 | 6.22 ± 0.09 | 6.15 ± 0.13 | 5.79 ± 0.09 |
| AVERAGE OF ALL PAIRS | | 6.72 ± 0.02 | 6.23 ± 0.02 | 6.21 ± 0.04 | 5.82 ± 0.04 |

CONVERSION LEARNING APPARATUS, CONVERSION LEARNING METHOD, CONVERSION LEARNING PROGRAM AND CONVERSION APPARATUS

CROSS-REFERENCE TO RELATED APPLICATIONS

This application is a 371 U.S. National Phase of International Application No. PCT/JP2020/003528, filed on Jan. 30, 2020. The entire disclosure of the above application is incorporated herein by reference.

TECHNICAL FIELD

The present invention relates to a conversion learning device, a conversion learning method, a conversion learning program, and a conversion device.

BACKGROUND ART

Attention has been focused on a technology, "voice conversion", that converts non-linguistic information or paralinguistic information into other values while preserving linguistic information included in a voice (a sequence of characters of a spoken sentence). Through voice conversion, for example, a voice with voice quality (one of speaker identities) changed from that of a speaker can be generated while linguistic information is kept unchanged. Paralanguage that can be converted through voice conversion widely ranges over speaker identity, mode of speaking, accent, voice quality, and the like. Accordingly, voice conversion can be applied to various fields such as speech aids and speech recognition.

A voice conversion can be formulated as a regression analysis problem to estimate a mapping function from feature amounts of a conversion-source voice to feature amounts of a conversion-target (to-be-converted-to) voice. For example, schemes using Gaussian mixture models (GMM) are highly effective and versatile, and are widely used. In recent years, studies have also been conducted on schemes using neural networks (NN), schemes using non-negative matrix factorization (NMF), and the like.

However, the above-mentioned schemes, all of which aim to convert voice quality, are not necessarily suitable to convert prosodic features. The prosodic features here are also called suprasegmental features in some cases, and are important elements that characterize speaker identities and a mode of speaking, such as a basic frequency pattern, speed of speaking, and rhythm of speaking. Accordingly, it is desired to develop a voice conversion that can effectively convert not only voice quality but also a prosodic feature.

Moreover, as disclosed in Non-Patent Literatures 1, 2, and 3, development of voice conversion using a sequence-to-sequence conversion (S2S) learning model is pursued, and such voice conversion demonstrates high effectiveness in tasks such as machine translation, speech recognition, and text-to-speech synthesis. A sequence-to-sequence conversion learning model is a type of deep learning that learns a conversion function from a sequence to a sequence.

CITATION LIST

Non-Patent Literature

Non-Patent Literature 1: H. Miyoshi, Y. Saito, S. Takamichi, and H. Saruwatari, "Voice conversion using sequence-to-sequence learning of context posterior probabilities," in Proc. Interspeech, 2017, pp. 1268-1272.

Non-Patent Literature 2: J.-X. Zhang, Z.-H. Ling, L.-J. Liu, Y. Jiang, L.-R. Dai, "Sequence-to-sequence acoustic modeling for voice conversion," arXiv:1810.06865 [cs.SD], October 2018.

Non-Patent Literature 3: F. Biadsy, R. J. Weiss, P. J. Moreno, D. Kanvesky, and Y. Jia, "Parrotron: An end-to-end speech-to-speech conversion model and its applications to hearing-impaired speech and speech separation," in Proc. Interspeech, 2019, pp. 4115-4119.

Moreover, a principle of voice conversion can also be applied to, for example, image conversion and video conversion. Accordingly, it is also desired to develop techniques that make it possible to perform effective image conversion and video conversion, by applying the schemes related to voice conversion as described above.

SUMMARY OF THE INVENTION

Technical Problem

The present invention has been made in light of the above-described circumstances, and an object of the present invention is to provide a conversion learning device, a conversion learning method, a conversion learning program, and a conversion device that make it possible to perform effective conversion processing.

Means for Solving the Problem

An aspect of the present invention is a conversion learning device including: a source encoding unit that converts, by using a first machine learning model, a feature amount sequence of a source domain that is a characteristic of conversion-source content data, into a first internal representation vector sequence that is a matrix in which internal representation vectors at individual locations of the feature amount sequence of the source domain are arranged; a target encoding unit that converts, by using a second machine learning model, a feature amount sequence of a target domain that is a characteristic of conversion-target content data, into a second internal representation vector sequence that is a matrix in which internal representation vectors at individual locations of the feature amount sequence of the target domain are arranged; an attention matrix calculation unit that calculates, by using the first internal representation vector sequence and the second internal representation vector sequence, an attention matrix that is a matrix mapping the individual locations of the feature amount sequence of the source domain to the individual locations of the feature amount sequence of the target domain, and calculates a third internal representation vector sequence that is a product of an internal representation vector sequence calculated by linear conversion of the first internal representation vector sequence and the attention matrix; a target decoding unit that calculates, by using the third internal representation vector sequence, a feature amount sequence of a conversion domain that is used to convert the source domain into the conversion domain, by using a third machine learning model; and a learning execution unit that causes at least one of the target encoding unit and the target decoding unit to learn such that a distance between a submatrix of the feature amount sequence of the target domain and a submatrix of the feature amount sequence of the conversion domain becomes shorter.

An aspect of the present invention is a conversion learning device including: a source encoding unit that converts, by using a first machine learning model, a feature amount sequence of a first domain that is a characteristic of conversion-source content data and is assigned a first index, into a first internal representation vector sequence that is a matrix in which internal representation vectors at individual locations of the feature amount sequence of the first domain are arranged; a target encoding unit that converts, by using a second machine learning model, a feature amount sequence of a second domain that is a characteristic of conversion-target content data and is assigned a second index that is different from the first index, into a second internal representation vector sequence that is a matrix in which internal representation vectors at individual locations of the feature amount sequence of the second domain are arranged; an attention matrix calculation unit that calculates, by using the first internal representation vector sequence and the second internal representation vector sequence, an attention matrix that is a matrix mapping the individual locations of the feature amount sequence of the first domain to the individual locations of the feature amount sequence of the second domain, and calculates a third internal representation vector sequence that is a product of an internal representation vector sequence calculated by linear conversion of the first internal representation vector sequence and the attention matrix; a target decoding unit that calculate, by using the third internal representation vector sequence, a feature amount sequence of a conversion domain that is used to convert the first domain into the conversion domain, by using a third machine learning model; and a learning execution unit that causes at least one of the target encoding unit and the target decoding unit to learn such that a distance between a submatrix of the feature amount sequence of the second domain and a submatrix of the feature amount sequence of the conversion domain becomes shorter.

An aspect of the present invention is a conversion learning method including: a source encoding step of converting, by using a first machine learning model, a feature amount sequence of a source domain that is a conversion source, into a first internal representation vector sequence that is a matrix in which internal representation vectors at individual locations of the feature amount sequence of the source domain are arranged; a target encoding step of converting, by using a second machine learning model, a feature amount sequence of a target domain that is a conversion target, into a second internal representation vector sequence that is a matrix in which internal representation vectors at individual locations of the feature amount sequence of the target domain are arranged; an attention matrix calculation step of calculating, by using the first internal representation vector sequence and the second internal representation vector sequence, an attention matrix that is a matrix mapping the individual locations of the feature amount sequence of the source domain to the individual locations of the feature amount sequence of the target domain, and calculating a third internal representation vector sequence that is a product of an internal representation vector sequence calculated by linear conversion of the first internal representation vector sequence and the attention matrix; a target decoding step of calculating, by using the third internal representation vector sequence, a feature amount sequence of a conversion domain that is used to convert the source domain into the conversion domain, by using a third machine learning model; and a learning execution step of causing at least one of a target encoding unit including the first machine learning model and a target decoding unit including the second machine learning model to learn such that a distance between a submatrix of the feature amount sequence of the target domain and a submatrix of the feature amount sequence of the conversion domain becomes shorter.

An aspect of the present invention is a conversion learning method including: a source encoding step of converting, by using a first machine learning model, a feature amount sequence of a first domain that is a characteristic of conversion-source content data and is assigned a first index, into a first internal representation vector sequence that is a matrix in which internal representation vectors at individual locations of the feature amount sequence of the first domain are arranged; a target encoding step of converting, by using a second machine learning model, a feature amount sequence of a second domain that is a characteristic of conversion-target content data and is assigned a second index that is different from the first index, into a second internal representation vector sequence that is a matrix in which internal representation vectors at individual locations of the feature amount sequence of the second domain are arranged; an attention matrix calculation step of calculating, by using the first internal representation vector sequence and the second internal representation vector sequence, an attention matrix that is a matrix mapping the individual locations of the feature amount sequence of the first domain to the individual locations of the feature amount sequence of the second domain, and calculating a third internal representation vector sequence that is a product of an internal representation vector sequence calculated by linear conversion of the first internal representation vector sequence and the attention matrix; a target decoding step of calculating, by using the third internal representation vector sequence, a feature amount sequence of a conversion domain that is used to convert the first domain into the conversion domain, by using a third machine learning model; and a learning execution step of causing at least one of a target encoding unit including the first machine learning model and a target decoding unit including the second machine learning model to learn such that a distance between a submatrix of the feature amount sequence of the second domain and a submatrix of the feature amount sequence of the conversion domain becomes shorter.

An aspect of the present invention is a conversion device including: a source encoding unit that converts, by using a first machine learning model, a feature amount sequence of a source domain that is a characteristic of conversion-source content data, into a first internal representation vector sequence that is a matrix in which internal representation vectors at individual locations of the feature amount sequence of the source domain are arranged; a target encoding unit that converts, by using a second machine learning model, a feature amount sequence of a target domain that is a characteristic of conversion-target content data, into a second internal representation vector sequence that is a matrix in which internal representation vectors at individual locations of the feature amount sequence of the target domain are arranged; an attention matrix calculation unit that calculates, by using the first internal representation vector sequence and the second internal representation vector sequence, an attention matrix that is a matrix mapping the individual locations of the feature amount sequence of the source domain to the individual locations of the feature amount sequence of the target domain, and calculates a third internal representation vector sequence that is a product of an internal representation vector sequence calculated by linear conversion of the first internal representation vector sequence and the attention matrix; and a target decoding unit that calculates, by using the third internal representation vector sequence, a feature amount sequence of a conversion domain that is used to convert the source domain into the conversion domain, by using a third machine learning model.

An aspect of the present invention is a conversion device including: a source encoding unit that converts, by using a first machine learning model, a feature amount sequence of a first domain that is a characteristic of conversion-source content data and is assigned a first index, into a first internal representation vector sequence that is a matrix in which internal representation vectors at individual locations of the feature amount sequence of the first domain are arranged; a target encoding unit that converts, by using a second machine learning model, a feature amount sequence of a second domain that is a characteristic of conversion-target content data and is assigned a second index that is different from the first index, into a second internal representation vector sequence that is a matrix in which internal representation vectors at individual locations of the feature amount sequence of the second domain are arranged; an attention matrix calculation unit that calculates, by using the first internal representation vector sequence and the second internal representation vector sequence, an attention matrix that is a matrix mapping the individual locations of the feature amount sequence of the first domain to the individual locations of the feature amount sequence of the second domain, and calculates a third internal representation vector sequence that is a product of an internal representation vector sequence calculated by linear conversion of the first internal representation vector sequence and the attention matrix; and a target decoding unit that calculates, by using the third internal representation vector sequence, a feature amount sequence of a conversion domain that is used to convert the first domain into the conversion domain, by using a third machine learning model.

Effects of the Invention

According to the present invention, it possible to perform effective conversion processing.

BRIEF DESCRIPTION OF DRAWINGS

FIG. 7 shows examples of mel-cepstral coefficients in cases where the conversion device according to the first embodiment does not perform forward attention correction, and performs forward attention correction.

FIG. 13 shows examples of mel-cepstral coefficients in cases where the conversion device according to the second embodiment performs one-to-one conversion, and performs many-to-one conversion in the inference phase.

FIG. 14 shows examples of mel-cepstral coefficients in cases where the conversion device according to the second embodiment performs batch conversion, and performs real-time conversion in the inference phase.

FIG. 15 shows examples of mel-cepstral coefficients in cases where each of the conversion device according to the first embodiment and the conversion device according to the second embodiment performs conversion without taking into consideration any of context preservation loss and orthogonal attention loss, performs conversion taking only the orthogonal attention loss into consideration, and performs conversion taking only the context preservation loss into consideration.

FIG. 16 shows examples of mel-cepstral coefficients in cases of a conventional conversion device, the conversion device according to the first embodiment, and the conversion device according to the second embodiment.

DESCRIPTION OF EMBODIMENTS

First Embodiment

Figure 1:
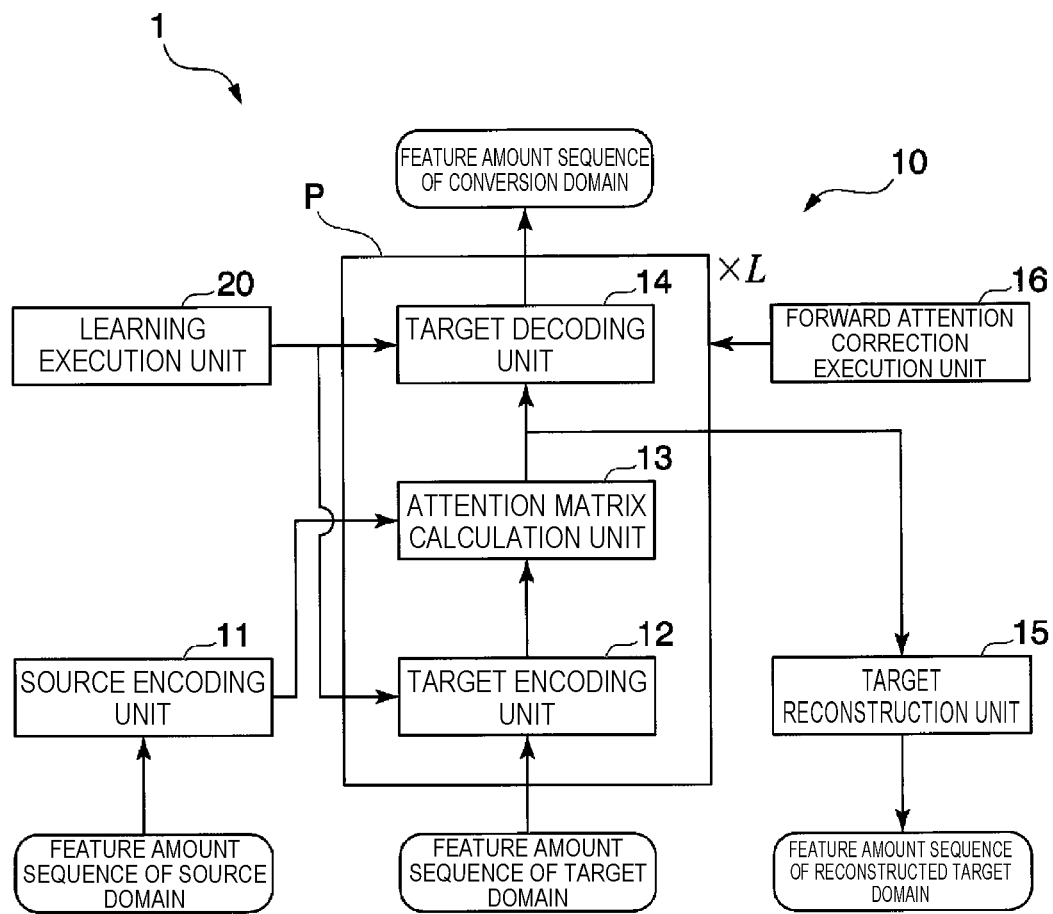
FIG. 1 shows an example of a conversion learning device according to a first embodiment.

Examples of a conversion learning device and a conversion device according to a first embodiment will be described with reference to FIGS. 1 and 2. FIG. 1 shows an example of the conversion learning device according to the first embodiment. As shown in FIG. 1, the conversion learning device 1 includes the conversion device 10 and a learning execution unit 20. The conversion device 10 includes a source encoding unit 11, a target encoding unit 12, an attention matrix calculation unit 13, a target decoding unit 14, a target reconstruction unit 15, and a forward attention correction execution unit 16.

Figure 2:
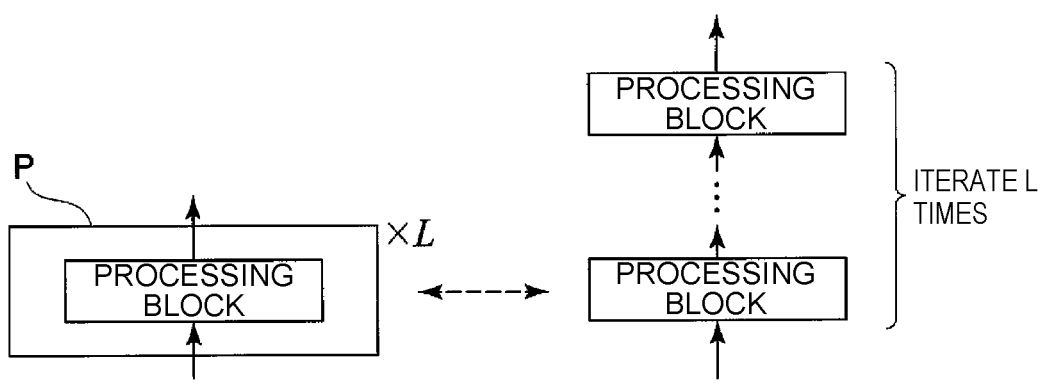
FIG. 2 is a diagram for describing iteration of processing performed by a target encoding unit, an attention matrix calculation unit, and a target decoding unit according to the first embodiment.

FIG. 2 is a diagram for describing iteration of processing performed by the target encoding unit, the attention matrix calculation unit, and the target decoding unit according to the first embodiment. As shown in FIGS. 1 and 2, the processing performed in a processing block P, that is, a series of the processing performed by the target encoding unit 12, the attention matrix calculation unit 13, and the target decoding unit 14 is iterated L (L: a natural number) times.

The source encoding unit 11 converts a feature amount sequence X of a source domain, which is a characteristic of conversion-source content data, into a first internal representation vector sequence Z by using a first machine learning model.

The source domain is data indicating a characteristic of the conversion-source content data, for example, a prosodic feature of conversion-source speech data. The feature amount sequence X of the source domain is represented by a following expression (1) including feature amount vectors $x_1, \ldots, x_N$ at individual locations of the feature amount sequence of the source domain, dimensions D of the feature amount vectors $x_1, \ldots, x_N$, and the number N of elements in the feature amount sequence of the source domain. When the content data is speech data, the individual locations are locations on a time axis, that is, time points.

[Math. 1]

$$X = [x_1, \ldots, x_N] \in \mathbb{R}^{D \times N} \quad (1)$$

The first machine learning model is, for example, a convolutional neural network (CNN). The first internal representation vector sequence Z is a matrix in which internal representation vectors at the individual locations of the feature amount sequence of the source domain are arranged, and is represented by following expressions (2) and (3). The expression (2) includes the number of channels, that is, dimensions $D_Z$ of the internal representation vectors.

[Math. 2]

$$Z \in \mathbb{R}^{D_Z \times N} \quad (2)$$

[Math. 3]

$$Z = \text{SrcEnc}(X) \quad (3)$$

The target encoding unit 12 converts a feature amount sequence Y of a target domain, which is a characteristic of conversion-target content data, into a second internal representation vector sequence Q by using a second machine learning model. A spoken sentence included in the conversion-target content data is identical to a spoken sentence included in the conversion-source content data.

The target domain is data indicating a prosodic feature of conversion-target speech data. The feature amount sequence Y of the target domain is represented by a following expression (4) including feature amount vectors $y_1, \ldots, y_M$ at individual locations of the feature amount sequence of the target domain, dimensions D of the feature amount vectors $y_1, \ldots, y_M$, and the number M of elements in the feature amount sequence of the target domain.

[Math. 4]

$$Y = [y_1, \ldots, y_M] \in \mathbb{R}^{D \times M} \quad (4)$$

The second machine learning model is, for example, a convolutional neural network. The second internal representation vector sequence Q is a matrix in which internal representation vectors at the individual locations of the feature amount sequence of the target domain are arranged, and is represented by following expressions (5) and (6). The expression (5) includes the number of channels, that is, dimensions $D_Q$ of the internal representation vectors.

[Math. 5]

$$Q \in \mathbb{R}^{D_Q \times M} \quad (5)$$

[Math. 6]

$$Q = \text{TrgEnc}(Y) \quad (8)$$

The attention matrix calculation unit 13 calculates an attention matrix A by using the first internal representation vector sequence Z and the second internal representation vector sequence Q. The attention matrix calculation unit 13 then calculates a third internal representation vector sequence R, which is a product of an internal representation vector sequence V calculated by linear conversion of the first internal representation vector sequence Z and the attention matrix A.

First, the attention matrix calculation unit 13 calculates an internal representation vector sequence K and the internal representation vector sequence V by applying a linear conversion L to the internal representation vector sequence Z of the source domain, as represented by a following expression (7),

[Math. 7]

$$(K, V) = (Z) \quad (7)$$

The attention matrix calculation unit 13 then calculates the attention matrix A by using a following expression (8) including the internal representation vector sequence K and the second internal representation vector sequence Q. Note that "softmax" included in the expression (8) means applying a softmax function to each column of a matrix. Moreover, "D'" included in the expression (8) is dimensions of column vectors included in the internal representation vector sequence K, the internal representation vector sequence Q, and the second internal representation vector sequence Q.

[Math. 8]

$$A = \text{softmax}(K^T Q / \sqrt{D'}) \quad (8)$$

The attention matrix A corresponds to a similarity matrix between the second internal representation vector sequence Q and the internal representation vector sequence K, and is a matrix mapping the individual locations of the feature amount sequence X of the source domain to the individual locations of the feature amount sequence Y of the target domain. Accordingly, the third internal representation vector sequence R, which is a matrix obtained by warping the internal representation vector sequence V in line with the time axis of the feature amount sequence Y of the target domain, is represented by a following expression (9).

[Math. 9]

$$R = VA \quad (9)$$

Alternatively, the attention matrix calculation unit 13 calculates H sets of an internal representation vector sequence $K_h$, an internal representation vector sequence $V_h$, and a second internal representation vector sequence $Q_h$ by applying a linear conversion $L_Z$ to the internal representation vector sequence Z of the source domain and applying a linear conversion $L_Q$ to the second internal representation vector sequence Q, as represented by following expressions (10) to (13). Note that "split" included in the expressions (12) and (13) represents a channel-wise split.

[Math. 10]

$$(K, V) = L_Z(Z) \quad (10)$$

[Math. 11]

$$(K_1, \ldots, K_H) = \text{split}(K) \quad (11)$$

[Math. 12]

$$(V_1, \ldots, V_H) = \text{split}(V) \quad (12)$$

[Math. 13]

$$(Q_1, \ldots, Q_H) = L_Q(Q) \quad (13)$$

The attention matrix calculation unit 13 then calculates an attention matrix A by using a following expression (14) including the internal representation vector sequence $K_h$ and the second internal representation vector sequence $Q_h$.

[Math. 14]

$$A_h = \text{softmax}(K_h^T Q_h / \sqrt{D})(h=1, \ldots, H) \quad (14)$$

In this case, the attention matrix calculation unit 13 calculates a third internal representation vector sequence R that is represented by following expressions (15) and (16). Note that "concat" included in the expression (16) represents a channel-wise concatenation.

[Math. 15]

$$R_h = V_h A_h (h=1, \ldots, H) \quad (15)$$

[Math. 16]

$$R = \text{concat}(R_1, \ldots, R_H) \quad (16)$$

In a description below, the processing in which the attention matrix calculation unit 13 calculates the third internal representation vector sequence R from the first internal representation vector sequence Z and the second internal representation vector sequence Q is expressed as in a following expression (17).

[Math. 17]

$$R = \text{attention}(Z, Q) \quad (17)$$

The target decoding unit 14 calculates, by using the third internal representation vector sequence R, a feature amount sequence I of a conversion domain that is used to convert the source domain into the conversion domain, by using a third machine learning model, as represented by a following expression (18). The third machine learning model is, for example, a convolutional neural network.

[Math. 18]

$$I = \text{TrgDec}(R) \quad (18)$$

Here, in a learning phase in which the above-mentioned first, second, and third machine learning models are learned, a pair of a source domain and a target domain are given. On the other hand, in an inference phase in which voice conversion is performed by using the three machine learning models, only a source domain is given. Accordingly, in the inference phase, the target encoding unit 12 receives as input, for example, the feature amount sequence I of the conversion domain that is most recently outputted by the own device.

Accordingly, in the learning phase in which the first, second, and third machine learning models are learned, it is necessary to make the feature amount sequence I of the conversion domain come to match, as closely as possible, a sequence obtained by shifting the time points of the feature amount sequence Y of the target domain. Moreover, when each of the target encoding unit 12 and the target decoding unit 14 calculates each output, it is necessary to perform the above-described processing under a condition that after an output of interest is calculated, subsequent outputs cannot be used. Such a condition corresponds to imposing causality on convolutional layers when the second machine learning model included in the target encoding unit 12 and the third machine learning model included in the target decoding unit 14 are implemented by using convolutional neural networks.

Accordingly, the distance between a submatrix of the feature amount sequence I of the conversion domain and a submatrix of the feature amount sequence Y of the target domain, represented by a following expression (19), can be thought of as a learning loss. The expression (19) includes a sign "$\|\cdot\|$" representing a matrix norm. The expression (19) includes a submatrix $I_{d:d', m:m'}$, which includes elements in d to d' rows and m to m' columns of the feature amount sequence I of the conversion domain, and a submatrix $Y_{d:d', m:m'}$, which includes elements in d to d' rows and m to m' columns of the feature amount sequence Y of the target domain.

[Math. 19]

$$\mathcal{L}_{dec} = \frac{1}{M} \| I_{1:D, 1:M-1} - Y_{1:D, 2:M} \| \quad (19)$$

The learning execution unit 20 causes at least one of the target encoding unit 12 and the target decoding unit 14 to learn such that the distance between the feature amount sequence Y of the target domain and the feature amount sequence I of the conversion domain becomes shorter. For example, the learning execution unit 20 causes at least one of the target encoding unit 12 and the target decoding unit 14 to learn such that the right-side value of the expression (19) is minimized.

By taking into consideration the learning loss represented by the expression (19), information on feature amounts of the target domain corresponding to element vectors at locations after a location of interest can be included in the third internal representation vector sequence R. Moreover, by taking into consideration the learning loss represented by the expression (19), information on a feature amount of the target domain at the same location as the location of interest can be concurrently preserved, whereby a result of inference in the inference phase can be made stable. The target reconstruction unit 15 is therefore introduced.

The target reconstruction unit 15 calculates, by using the third internal representation vector sequence R, a feature amount sequence J of a reconstructed target domain, which is a domain obtained by reconstructing the target domain, by using a fourth machine learning model, as represented by a following expression (20). The fourth machine learning model is, for example, a convolutional neural network.

[Math. 20]

$$J = \text{TrgRec}(R) \quad (20)$$

The learning execution unit 20 causes the target reconstruction unit 15 to learn such that the distance between the feature amount sequence Y of the target domain and the feature amount sequence J of the reconstructed target domain becomes shorter. For example, the learning execution unit 20 causes the target reconstruction unit 15 to learn such that the right-side value of a following expression (21) is minimized. A learning loss represented by the expression (21) is referred to as context preservation loss (CPL).

[Math. 21]

$$\mathcal{L}_{rec} = \frac{1}{M}\|J - Y\|  \quad (21)$$

When the number L of iterations of the processing performed in the processing block P shown in FIGS. 1 and 2 is two or more, L third internal representation vector sequences R are calculated by the attention matrix calculation unit 13. In such a case, the context preservation loss is an arithmetic mean of the expression (21) with respect to at least some of the L third internal representation vector sequences R.

Moreover, since a spoken sentence included in the conversion-source content data and a spoken sentence included in the conversion-target content data are identical as mentioned above, diagonal components and elements in vicinities thereof of the attention matrix A tend to be predominant in many cases.

Accordingly, the learning execution unit 20 causes at least one of the target encoding unit 12 and the target decoding unit 14 to learn such that non-diagonal components of the attention matrix A become smaller. For example, the learning execution unit 20 causes at least one of the target encoding unit 12 and the target decoding unit 14 to learn such that the right-side value of a following expression (22) is minimized. A learning loss represented by the expression (22) is referred to as diagonal attention loss (DAL).

[Math. 22]

$$\mathcal{L}_{diag} = \frac{1}{NM}\|W_{N\times M}(v) \odot A\|  \quad (22)$$

Note that a sign between "$W_{N\times M}(v)$" and "A" in the expression (22) denotes element-wise products of a matrix $W_{N\times M}(v)$ and the attention matrix A. Moreover, the matrix $W_{N\times M}(v)$ is a matrix with N rows and M columns as represented by a following expression (23), and is a matrix in which an (n, m) element is represented by a following expression (24).

[Math. 23]

$$W_{N\times M}(v) \in \mathbb{R}^{N\times M}  \quad (23)$$

[Math. 24]

$$\theta_{n,m} = 1 - e^{-(n/N - m/M)^2/2v^2}  \quad (24)$$

Each location of the feature amount sequence Y of the target domain is thought to correspond to one, or a few at most, of the locations of the feature amount sequence X of the source domain. This implies that arbitrary column vectors included in the attention matrix A are orthogonal.

Accordingly, the learning execution unit 20 causes at least one of the target encoding unit 12 and the target decoding unit 14 to learn such that the number of orthogonal column vectors included in the attention matrix A becomes larger. For example, the learning execution unit 20 causes at least one of the target encoding unit 12 and the target decoding unit 14 to learn such that the right-side value of a following expression (25) is minimized. A learning loss represented by the expression (25) is referred to as orthogonal attention loss (OAL). Note that a sign between "$W_{N\times M}(\rho)$" and "$(AA^T)$" in the expression (25) denotes element-wise products of a matrix $W_{N\times M}(\rho)$ and $(AA^T)$,

[Math. 25]

$$\mathcal{L}_{orth} = \frac{1}{N^2}\|W_{N\times N}(\rho) \odot (AA^T)\|  \quad (25)$$

When the expressions (19), (21), (22), and (25) are taken into consideration, a learning loss is represented by a following expression (26).

[Math. 26]

$$\mathcal{L} = \mathbb{E}_{(X,Y)}[\mathcal{L}_{dec} + \lambda_r \mathcal{L}_{rec} + \lambda_d \mathcal{L}_{diag} + \lambda_o \mathcal{L}_{orth}]  \quad (26)$$

Note that when in the inference phase, the target encoding unit 12 receives, as input, not the feature amount sequence Y of the target domain but the feature amount sequence I of the conversion domain outputted from the target decoding unit 14. Then, the target encoding unit 12 converts the feature amount sequence I of the conversion domain into a second internal representation vector sequence Q by using the second machine learning model.

Moreover, when in the inference phase, and when the number L of iterations of the processing performed in the processing block P shown in FIGS. 1 and 2 is two or more, the forward attention correction execution unit 16 restricts the attention matrix calculation unit 13 such that a peak of a distribution of attention locations of the attention matrix A changes monotonically and continuously. When the content data is speech data, the attention locations here are attention time points. Note that the conversion device 10 does not need to include the forward attention correction execution unit 16.

When the conversion device 10 performs conversion in real time in the inference phase, the learning execution unit 20 causes the source encoding unit 11 to learn under a constraint that the feature amount sequence X of the source domain that is inputted into the source encoding unit 11 before a location at which the feature amount sequence X of the source domain is to be converted into the first internal representation vector sequence Z, is converted into the first internal representation vector sequence Z.

Figure 3:
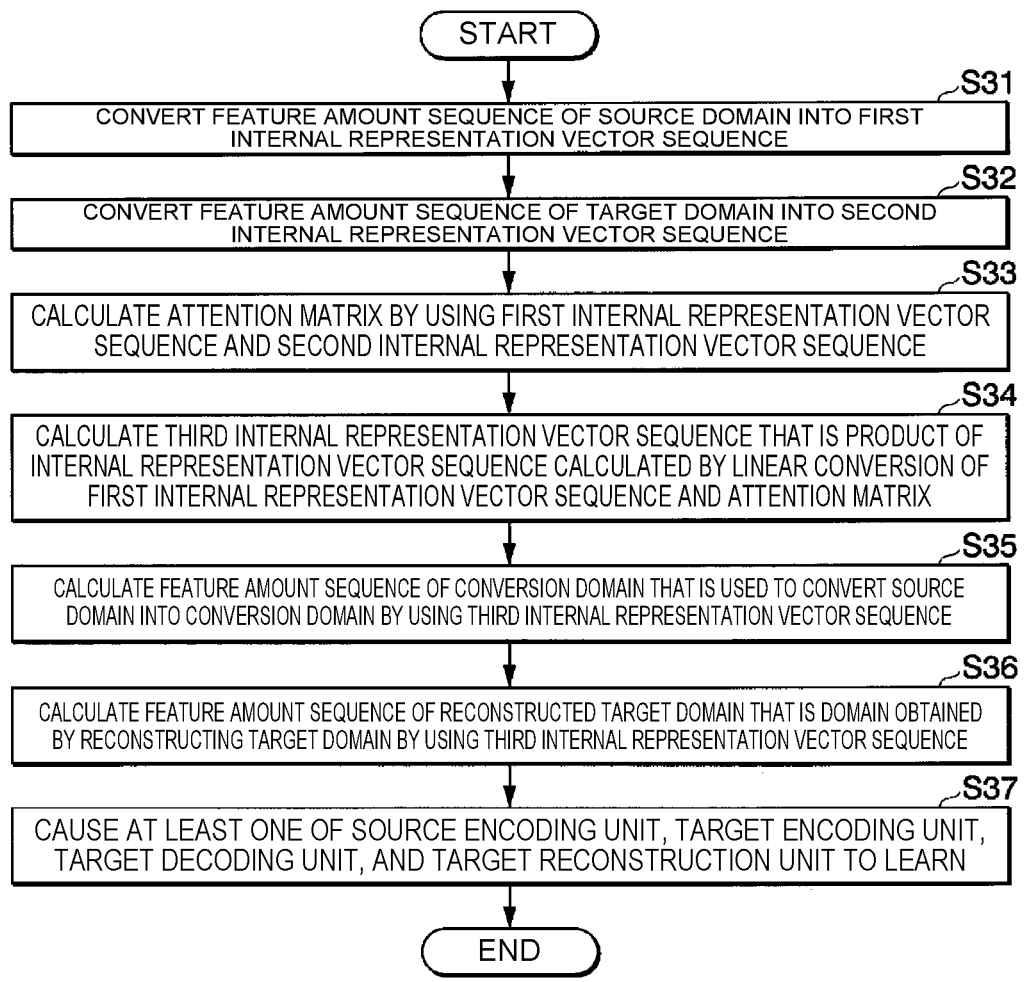
FIG. 3 is a flowchart showing an example of processing performed in a learning phase by the conversion learning device according to the first embodiment.

Next, an example of processing performed in the learning phase by the conversion learning device 1 will be described with reference to FIG. 3. FIG. 3 is a flowchart showing an example of the processing performed in the learning phase by the conversion learning device according to the first embodiment. The processing shown in FIG. 3 is performed each time a pair of a source domain and a target domain are inputted into the conversion learning device 1.

In step S31, the source encoding unit 11 converts a feature amount sequence X of a source domain into a first internal representation vector sequence Z.

In step S32, the target encoding unit 12 converts a feature amount sequence Y of a target domain into a second internal representation vector sequence Q.

In step S33, the attention matrix calculation unit 13 calculates an attention matrix A by using the first internal representation vector sequence Z and the second internal representation vector sequence Q.

In step S34, the attention matrix calculation unit 13 calculates a third internal representation vector sequence R, which is a product of an internal representation vector sequence V calculated by linear conversion of the first internal representation vector sequence Z and the attention matrix A.

In step S35, the target decoding unit 14 calculates a feature amount sequence I of a conversion domain that is used to convert the source domain into the conversion domain by using the third internal representation vector sequence R.

In step S36, the target reconstruction unit 15 calculates a feature amount sequence J of a reconstructed target domain, which is a domain obtained by reconstructing the target domain by using the third internal representation vector sequence R.

In step S37, the learning execution unit 20 causes at least one of the source encoding unit, the target encoding unit, the target decoding unit, and the target reconstruction unit to learn.

Note that the conversion learning device 1 may interchange order of step S31 and step S32. The conversion learning device 1 may interchange order of step S35 and step S36.

Figure 4:
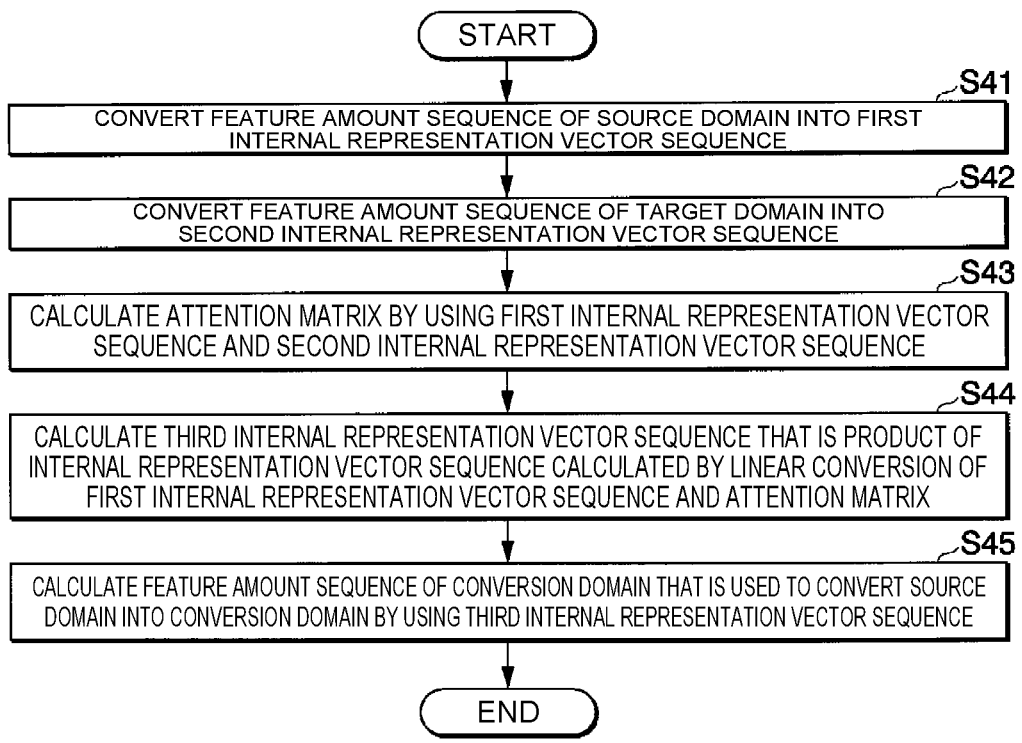
FIG. 4 is a flowchart showing an example of processing performed in an inference phase by a conversion device according to the first embodiment.

Next, an example of processing performed in the inference phase by the conversion device 10 will be described with reference to FIG. 4. FIG. 4 is a flowchart showing an example of the processing performed in the inference phase by the conversion device according to the first embodiment.

In step S41, the source encoding unit 11 converts a feature amount sequence X of a source domain into a first internal representation vector sequence Z.

In step S42, the target encoding unit 12 converts a feature amount sequence Y of a target domain into a second internal representation vector sequence Q.

In step S43, the attention matrix calculation unit 13 calculates an attention matrix A by using the first internal representation vector sequence Z and the second internal representation vector sequence Q.

In step S44, the attention matrix calculation unit 13 calculates a third internal representation vector sequence R, which is a product of an internal representation vector sequence V calculated by linear conversion of the first internal representation vector sequence Z and the attention matrix A.

In step S45, the target decoding unit 14 calculates a feature amount sequence I of a conversion domain that is used to convert the source domain into the conversion domain by using the third internal representation vector sequence R.

Note that the conversion device 10 may interchange order of step S41 and step S42.

The conversion learning device 1 and the conversion device 10 according to the first embodiment have been described hereinabove. The conversion learning device 1 converts a feature amount sequence X of a source domain into a first internal representation vector sequence Z by using the first machine learning model, and converts a feature amount sequence Y of a target domain into a second internal representation vector sequence Q by using the second machine learning model. The conversion learning device 1 next calculates an attention matrix A by using the first internal representation vector sequence X and the second internal representation vector sequence Y, and calculates a third internal representation vector sequence R, which is a product of an internal representation vector sequence V calculated by linear conversion of the first internal representation vector sequence X and the attention matrix A. The conversion learning device 1 then calculates, by using the third internal representation vector sequence R, a feature amount sequence I of a conversion domain that is used to convert the source domain into the conversion domain, by using the third machine learning model. Moreover, the conversion learning device 1 causes at least one of the target encoding unit 12 and the target decoding unit 14 to learn such that the distance between a submatrix of the feature amount sequence Y of the target domain and a submatrix of the feature amount sequence I of the conversion domain becomes shorter.

Thus, the conversion learning device 1 can perform learning with a higher probability of accuracy, can generate effective learning models, and can make it possible to perform effective conversion processing using the learning models. When the content data is speech data, the conversion learning device 1 can make it possible to perform effective conversion processing including a prosodic feature.

The conversion learning device 1 calculates, by using the third internal representation vector sequence R, a feature amount sequence I of a reconstructed target domain, which is a domain obtained by reconstructing the target domain, by using the fourth machine learning model. Then, the conversion learning device 1 causes the target reconstruction unit to learn such that the distance between the feature amount sequence Y of the target domain and the feature amount sequence J of the reconstructed target domain becomes shorter. Thus, the conversion learning device 1 can make it possible for the conversion device 10 to output a more stable result of inference.

The conversion learning device 1 causes at least one of the target encoding unit 12 and the target decoding unit 14 to learn such that non-diagonal components of the attention matrix A become smaller. Thus, the conversion learning device 1 can perform learning that is based on a premise that a spoken sentence in the content data including the source domain matches a spoken sentence in the content data including the target domain, and can make it possible for the conversion device 10 to output a more stable result of inference.

The conversion learning device 1 causes at least one of the target encoding unit 12 and the target decoding unit 14 to learn such that the number of orthogonal column vectors included in the attention matrix A becomes larger. Thus, the conversion learning device 1 can perform learning that is based on a premise that each location of the feature amount sequence X of the source domain and each location of the feature amount sequence Y of the target domain largely correspond to each other, and can make it possible for the conversion device 10 to output a more stable result of inference.

The conversion learning device 1 causes the source encoding unit 11 to learn under the constraint that the feature amount sequence X of the source domain that is inputted into the source encoding unit 11 before a location at which the feature amount sequence X of the source domain is to be converted into the first internal representation vector sequence Z, is converted into the first internal representation vector sequence Z. Thus, the conversion learning device 1 makes it possible for the conversion device 10 to perform conversion processing online in real time.

Since the conversion device 10 performs conversion processing by using the feature amount sequence of the conversion domain through the conversion learning device 1, the conversion device 10 can perform effective conversion processing.

Moreover, when the processing in which the target encoding unit 12 converts the feature amount sequence I of the conversion domain into a second internal representation vector sequence Q, the attention matrix calculation unit 13 calculates a third internal representation vector sequence R, and the target decoding unit 14 calculates a feature amount sequence I of the conversion domain, is performed at least two times, the conversion device 10 restricts the attention matrix calculation unit such that the peak of the distribution of the attention locations of the attention matrix A changes monotonically and continuously. Thus, the conversion device 10 can perform conversion processing while the peak of the distribution of the attention locations continuously progresses.

Next, specific examples of effects brought about by the conversion learning device 1 and the conversion device 10 according to the first embodiment will be described with reference to FIGS. 5 to 7. In the description of the effects, all of the source encoding unit 11, the target encoding unit 12, the target decoding unit 14, and the target reconstruction unit 15 include convolutional layers.

Moreover, for an acoustic feature amount vector, a combined form of a mel-cepstral coefficient, a logarithmic basic frequency pattern, an aperiodicity index, and a voiced/unvoiced indicator is used. The voiced/unvoiced indicator is "1" in a voiced segment, and is "0" in an unvoiced segment.

For an evaluation index, mel-cepstral distortion (MCD) is used. Assuming that a mel-cepstral coefficient for the target domain and a mel-cepstral coefficient for the conversion domain are represented by expressions (27) and (28), respectively, the mel-cepstral distortion is expressed as in an expression (29).

[Math. 27]
$$\hat{c} = [\hat{c}_1, \ldots, \hat{c}_{28}]^T \quad (27)$$

[Math. 28]
$$c = [c_1, \ldots, c_{28}]^T \quad (28)$$

[Math. 29]
$$MCD[dB] = \frac{10}{\ln 10} \sqrt{2 \sum_{i=2}^{28} (\hat{c}_i - c_i)^2}, \quad (29)$$

Note, however, that since time points of the target domain and time points of the conversion domain are not necessarily aligned with each other, quality of the conversion domain is evaluated by determining corresponding locations of the two sequences through dynamic time warping (DTW) using the mel-cepstral coefficients for a local distance, and then by calculating an average of mel-cepstral coefficients based on the corresponding locations.

Figure 5:
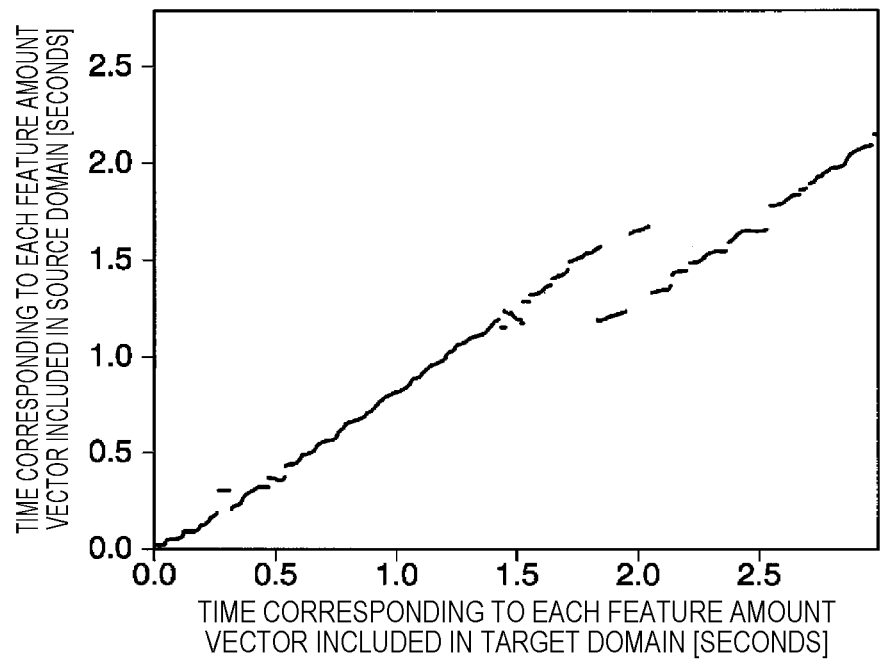
FIG. 5 shows an example of an attention matrix in a case where the conversion device according to the first embodiment does not perform forward attention correction in the inference phase.

FIG. 5 shows an example of an attention matrix in a case where the conversion device according to the first embodiment does not perform forward attention correction in the inference phase. In FIG. 5, a horizontal axis represents time points corresponding to feature amount vectors included in the target domain, and a vertical axis represents time points corresponding to feature amount vectors included in the source domain. Referring to FIG. 5, it can be understood that the peak of the distribution of the attention locations of the attention matrix A is discontinuous despite a fact that spoken sentences in the source domain and the target domain are reflected. This is because no forward attention correction is performed.

Figure 6:
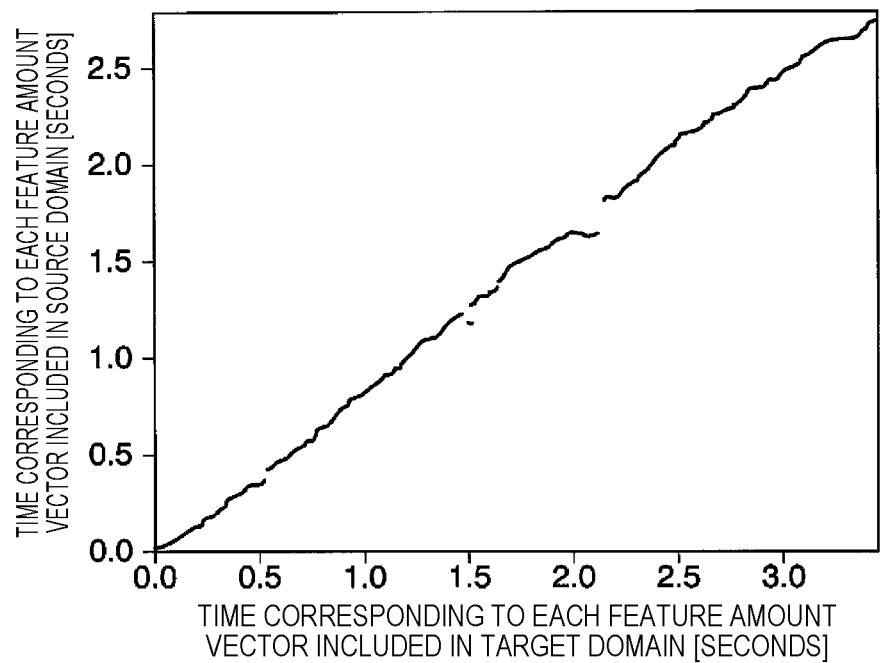
FIG. 6 shows an example of an attention matrix in a case where the conversion device according to the first embodiment performs forward attention correction in the inference phase.

FIG. 6 shows an example of an attention matrix in a case where the conversion device according to the first embodiment performs forward attention correction in the inference phase. In FIG. 6, a horizontal axis represents time points corresponding to feature amount vectors included in the target domain, and a vertical axis represents time points corresponding to feature amount vectors included in the source domain. Referring to FIG. 6, it can be understood that the peak of the distribution of the attention locations of the attention matrix A changes monotonically and continuously. This is because forward attention correction is performed.

FIG. 7 shows examples of mel-cepstral coefficients in cases where the conversion device according to the first embodiment does not perform forward attention correction, and performs forward attention correction. Referring to a table shown in FIG. 7, it can be understood that the mel-cepstral distortion is smaller and conversion is more effectively performed when forward attention correction is performed, than when no forward attention correction is performed.

Second Embodiment

Figure 8:
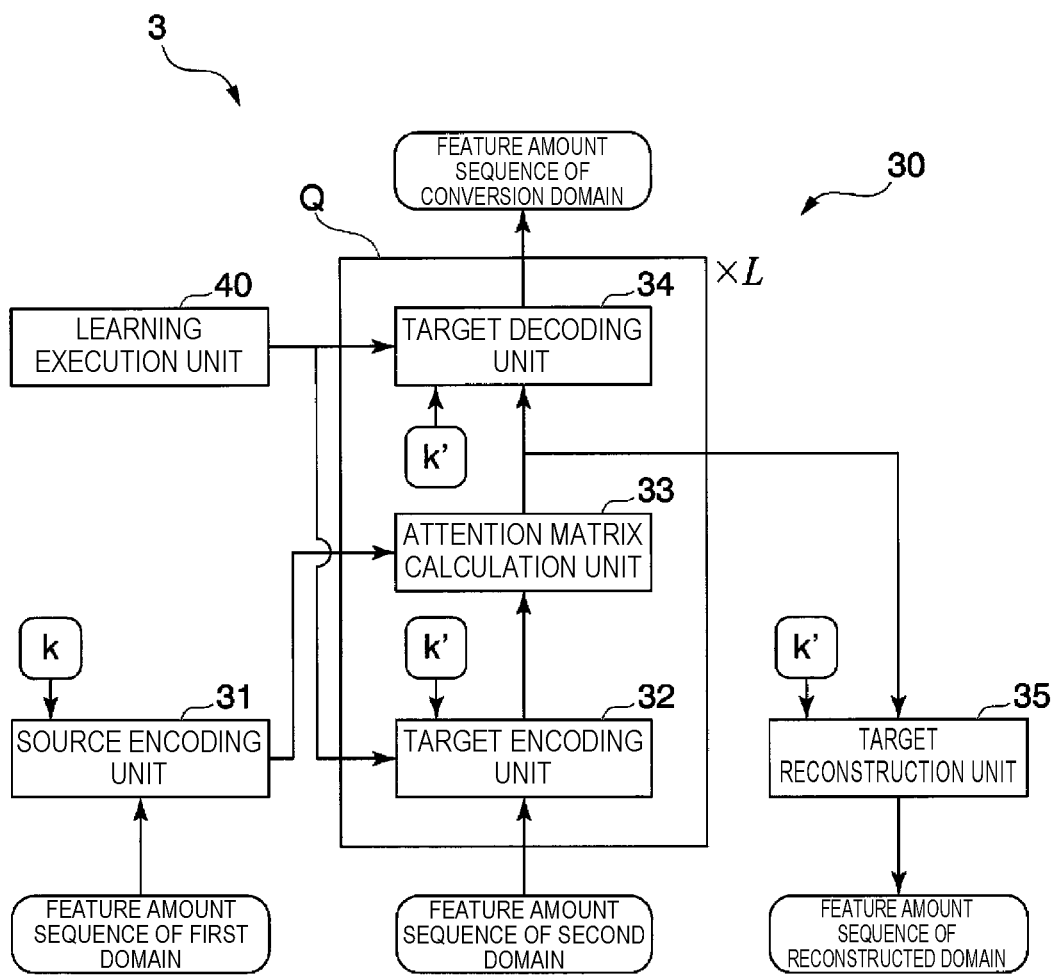
FIG. 8 shows an example of a conversion learning device according to a second embodiment.

Examples of a conversion learning device and a conversion device according to a second embodiment will be described with reference to FIG. 8. FIG. 8 shows an example of the conversion learning device according to the second embodiment. As shown in FIG. 8, the conversion learning device 3 includes the conversion device 30 and a learning execution unit 40. The conversion device 30 includes a source encoding unit 31, a target encoding unit 32, an attention matrix calculation unit 33, a target decoding unit 34, and a target reconstruction unit 35. Unlike the conversion learning device 1 and the conversion device 10 according to the first embodiment, the conversion learning device 3 and the conversion device 30 enable conversion between feature amount sequences $X^{(1)}, \ldots, X^{(K)}$ of the same spoken voices belonging to a plurality of domains, for example, K types of domains, with a single network set.

The source encoding unit 31 converts a feature amount sequence $X^{(k)}$ of a first domain, which is a characteristic of conversion-source content data and is assigned a first index k, into a first internal representation vector sequence $Z^{(k)}$ by using a first machine learning model. The first internal representation vector sequence $Z^{(k)}$ is a matrix in which internal representation vectors at individual locations of the feature amount sequence of the first domain are arranged. When the content data is speech data, the individual locations are locations on a time axis, that is, time points. A relation between the feature amount sequence $X^{(k)}$ of the first domain and the first internal representation vector sequence $Z^{(k)}$ is represented by a following expression (30). The first machine learning model is, for example, a convolutional neural network.

[Math. 30]
$$Z^{(k)} = \text{SrcEnc}(X^{(k)}, k) \quad (30)$$

The target encoding unit 32 converts a feature amount sequence $X^{(k')}$ of a second domain, which is a characteristic of conversion-target content data and is assigned a second index k' that is different from the first index k, into a second internal representation vector sequence $Q^{(k')}$ by using a second machine learning model. The second internal representation vector sequence $Q^{(k')}$ is a matrix in which internal representation vectors at individual locations of the feature amount sequence of the second domain are arranged. A relation between the feature amount sequence $X^{(k')}$ of the second domain and the second internal representation vector sequence $Q^{(k')}$ is represented by a following expression (31). The second machine learning model is, for example, a convolutional neural network.

[Math. 31]
$$Q^{(k')} = \text{TrgEnc}(X^{(k')}, k') \quad (31)$$

First, the attention matrix calculation unit 33, similarly to the attention matrix calculation unit 13 according to the first embodiment, calculates an attention matrix $A^{(k,k')}$ by using the first internal representation vector sequence $Z^{(k)}$, the second internal representation vector sequence $Q^{(k')}$, and following expressions (32) and (33).

[Math. 32]

$$(K^{(k)}, V^{(k)}) = L(Z^{(k)}) \tag{32}$$

[Math. 33]

$$A^{(k,k')} = \text{softmax}_n(K^{(k)T} Q^{(k')} / \sqrt{D}) \tag{33}$$

Then, similarly to the attention matrix calculation unit 13 according to the first embodiment, the attention matrix calculation unit 33 calculates a third internal representation vector sequence $R^{(k,k')}$ by using a following expression (34).

[Math. 34]

$$R^{(k,k')} = V^{(k)} A^{(k,k')} \tag{34}$$

Alternatively, similarly to the attention matrix calculation unit 13 according to the first embodiment, the attention matrix calculation unit 33 calculates H sets of an internal representation vector sequence $K_h^{(k)}$, an internal representation vector sequence $V_h^{(k)}$, and a second internal representation vector sequence $Q^{(k')}$ by applying a linear conversion $L_Z$ to the internal representation vector sequence $Z^{(k)}$ of the first domain, and applying a linear conversion $L_Q$ to the second internal representation vector sequence $Q^{(k')}$, as represented by following expressions (35) to (38).

[Math. 35]

$$(K^{(k)}, V^{(k)}) = L_Z(Z^{(k)}) \tag{35}$$

[Math. 36]

$$(K_1^{(k)}, \ldots, K_H^{(k)}) = \text{split}(K^{(k)}) \tag{36}$$

[Math. 37]

$$(V_1^{(k)}, \ldots, V_H^{(k)}) = \text{split}(V^{(k)}) \tag{37}$$

[Math. 38]

$$(Q_1^{(k')}, \ldots, Q_H^{(k')}) = L_Q(Q^{(k')}) \tag{38}$$

Then, similarly to the attention matrix calculation unit 13 according to the first embodiment, the attention matrix calculation unit 33 calculates an attention matrix $A_h^{(k,k')}$ by using a following expression (39) including the internal representation vector sequence $K_h^{(k)}$ and the second internal representation vector sequence $Q_h^{(k')}$.

[Math. 39]

$$A_h^{(k,k')} = \text{softmax}(K_h^{(k)T} Q_h^{(k')} / \sqrt{D})(h=1, \ldots, H) \tag{39}$$

In this case, the attention matrix calculation unit 33 calculates a third internal representation vector sequence $R^{(k,k')}$ that is represented by following expressions (40) and (41).

[Math. 40]

$$R_h^{(k,k')} = V_h^{(k)} A_h^{(k,k')} (h=1 \ldots, H) \tag{40}$$

[Math. 41]

$$R^{(k,k')} = \text{concat}(R_1^{(k,k')}, \ldots, R_H^{(k,k')}) \tag{41}$$

In a description below, the processing in which the attention matrix calculation unit 33 calculates the third internal representation vector sequence $R^{(k,k')}$ from the first internal representation vector sequence $Z^{(k)}$ and the second internal representation vector sequence $Q^{(k')}$ is expressed as in a following expression (42).

[Math. 42]

$$R^{(k,k')} = \text{attention}(Z^{(k)}, Q^{(k')}) \tag{42}$$

The target decoding unit 34 calculates, by using the third internal representation vector sequence $R^{(k,k')}$, a feature amount sequence $F^{(k,k')}$ of a conversion domain that is used to convert the first domain into the conversion domain, by using a third machine learning model, as represented by a following expression (43). The third machine learning model is, for example, a convolutional neural network.

[Math. 43]

$$F^{(k,k')} = \text{TrgDec}(R^{(k,k')}, k') \tag{43}$$

Here, in a learning phase in which the above-mentioned first, second, and third machine learning models are learned, a pair of a first domain and a target domain are given. On the other hand, in an inference phase in which voice conversion is performed by using the three machine learning models, only a first domain is given. Accordingly, in the inference phase, the target encoding unit 32 receives as input, for example, the feature amount sequence $F^{(k,k')}$ of the conversion domain that is most recently outputted by the own device.

A learning loss represented as a distance between the feature amount sequence $F^{(k,k')}$ of the conversion domain and the feature amount sequence $X^{(k')}$ of the second domain is represented by a following expression (44). The expression (44) includes a submatrix $F^{(k,k')}_{d:d',\ m:m'}$, which includes elements in d to d' rows and m to m' columns of the feature amount sequence $F^{(k,k')}$ of the conversion domain, and a submatrix $X^{(k')}_{d:d',\ m:m'}$, which includes elements in d to d' rows and m to m' columns of the feature amount sequence $X^{(k')}$ of the second domain.

[Math. 44]

$$\mathcal{L}_{dec}^{(k,k')} = \frac{1}{N^{(k')}} \left\| F^{(k,k')}_{1:D, 1:N^{(k')}-1} - X^{(k')}_{1:D, 2:N^{(k')}} \right\| \tag{44}$$

The learning execution unit 40 causes at least one of the target encoding unit 32 and the target decoding unit 34 to learn such that the distance between the submatrix of the feature amount sequence $X^{(k')}$ of the second domain and the submatrix of the feature amount sequence $F^{(k,k')}$ of the conversion domain becomes shorter. For example, the learning execution unit 40 causes at least one of the target encoding unit 32 and the target decoding unit 34 to learn such that the right-side value of the expression (44) is minimized.

By taking into consideration the learning loss represented by the expression (44), information on feature amounts of the second domain corresponding to element vectors at locations after a location of interest can be included in the third internal representation vector sequence $R^{(k,k')}$. Moreover, by taking into consideration the learning loss represented by the expression (44), information on a feature amount of the second domain at the same location as the location of interest can be concurrently preserved, whereby a result of inference in the inference phase can be made stable. The target reconstruction unit 35 is therefore introduced.

The target reconstruction unit 35 calculates, by using the fourth internal representation vector sequence $R^{(k,k')}$, a feature amount sequence $J^{(k,k')}$ of a reconstructed domain, which is a domain obtained by reconstructing the second domain, by using a fourth machine learning model, as represented by a following expression (45). The fourth machine learning model is, for example, a convolutional neural network.

[Math. 45]

$$G^{(k,k')} = \text{TrgRec}(R^{(k,k')}, k') \qquad (45)$$

The learning execution unit 40 causes the target reconstruction unit 35 to learn such that the distance between the feature amount sequence $X^{(k)}$ of the second domain and the feature amount sequence $J^{(k,k')}$ of the reconstructed domain becomes shorter. For example, the learning execution unit 40 causes the target reconstruction unit 15 to learn such that the right-side value of a following expression (46) is minimized. A learning loss represented by the expression (46) is referred to as context preservation loss.

[Math. 46]

$$\mathcal{L}_{rec}^{(k,k')} = \frac{1}{N^{(k')}} \left\| G^{(k')} - X^{(k')} \right\| \qquad (46)$$

When the number L of iterations of the processing performed in a processing block Q shown in FIG. 8 is two or more, L third internal representation vector sequences R are calculated by the attention matrix calculation unit 33. In such a case, the context preservation loss is an arithmetic mean of the expression (46) with respect to at least some of the L third internal representation vector sequences R.

Moreover, as in the first embodiment, since a spoken sentence included in the conversion-source content data and a spoken sentence included in the conversion-target content data are identical, diagonal components and elements in vicinities thereof of the attention matrix $A^{(k,k')}$ tend to be predominant in many cases.

Accordingly, the learning execution unit 40 causes at least one of the target encoding unit 32 and the target decoding unit 34 to learn such that non-diagonal components of the attention matrix $A^{(k,k')}$ become smaller. For example, the learning execution unit 40 causes at least one of the target encoding unit 12 and the target decoding unit 14 to learn such that the right-side value of a following expression (47) is minimized. A learning loss represented by the expression (47) is referred to as diagonal attention loss.

[Math. 47]

$$\mathcal{L}_{diag}^{(k,k')} = \frac{1}{N^{(k)}N^{(k')}} \left\| W_{N_k \times N_{k'}}(v) \odot A^{(k,k')} \right\| \qquad (47)$$

As in the first embodiment, each location of the feature amount sequence $X^{(k')}$ of the second domain is thought to correspond to one, or a few at most, of the locations of the feature amount sequence $X^{(k)}$ of the first domain. This implies that arbitrary column vectors included in the attention matrix $A^{(k,k')}$ are orthogonal.

Accordingly, the learning execution unit 40 causes at least one of the target encoding unit 32 and the target decoding unit 34 to learn such that the number of orthogonal column vectors included in the attention matrix $A^{(k,k')}$ becomes larger. For example, the learning execution unit 40 causes at least one of the target encoding unit 32 and the target decoding unit 34 to learn such that the right-side value of a following expression (48) is minimized. A learning loss represented by the expression (48) is referred to as orthogonal attention loss.

[Math. 48]

$$\mathcal{L}_{orth}^{(k,k')} = \frac{1}{N^{(k)2}} \left\| W_{N_k \times N_k}(\rho) \odot \left( A^{(k,k')} A^{(k,k')T} \right) \right\| \qquad (48)$$

When the expressions (44), (46), (47), and (48) are taken into consideration, a learning loss is represented by a following expression (49).

[Math. 49]

$$\mathcal{L} = \sum_k \sum_{k' \neq k} \mathbb{E}_{(X^{(k)}, X^{(k')})} \left[ \mathcal{L}_{dec}^{(k,k')} + \lambda_r \mathcal{L}_{rec}^{(k,k')} + \lambda_d \mathcal{L}_{diag}^{(k,k')} + \lambda_o \mathcal{L}_{orth}^{(k,k')} \right] \qquad (49)$$

Note that when in the inference phase, the target encoding unit 32 receives, as input, not the feature amount sequence $X^{(k')}$ of the second domain but the feature amount sequence $F^{(k,k')}$ of the conversion domain outputted from the target decoding unit 34. Then, the target encoding unit 32 converts the feature amount sequence $F^{(k,k')}$ of the conversion domain into a second internal representation vector sequence $Q^{(k')}$ by using the second machine learning model.

Next, layers included in the networks included in the conversion learning device 3 and the conversion device 30 will be described by using expressions (50) to (57) when necessary.

It is preferable that the networks included in the conversion learning device 3 and the conversion device 30 include a convolutional layer and a self-attention layer, for following reasons. In the conversion learning device 3 and the conversion device 30, it is conceivable that a distribution of inputs into each hidden layer of each network can greatly vary, depending on at least one of the first domain and the second domain. Moreover, since a range of values to be covered by each layer is inevitably wide, compared to the conversion learning device 1 and the conversion device 10 according to the first embodiment, even if a batch normalization layer, an instance normalization layer, or the like is inserted as in regular cases, it is conceivable that accuracy of a result of inference in the inference phase can decrease.

To avoid such situations, it is preferable that the networks included in the conversion learning device 3 and the conversion device 30 include a layer that performs normalization, weight normalization, or layer normalization, depending on the first domain or the second domain. In other words, it is preferable that the source encoding unit 31 include a neural network including a layer that performs normalization, weight normalization, or layer normalization, depending on the first domain. Moreover, it is preferable that the target encoding unit 32 include a neural network including a layer that performs normalization, weight normalization, or layer normalization, depending on the second domain. It is preferable that the target decoding unit 34 include a neural network including a layer that performs normalization, weight normalization, or layer normalization, depending on the first domain. It is preferable that the target reconstruction unit 35 include a neural network including a layer that performs normalization, weight normalization, or layer normalization, depending on the second domain.

For example, regular batch normalization processing is represented by a following expression (47).

[Math. 50]

$$Y=B(X) \tag{50}$$

The batch normalization represented by the expression (47) corresponds to executing an arithmetic operation represented by a following expression (51) for each element. The expression (51) includes a batch mean $\mu_d(X)$ of a d-th channel, and a standard deviation $\sigma_d(X)$ and a standard deviation $\sigma_d(X)$ of the d-th channel. Moreover, the expression (51) includes a shift amount $\gamma$ represented by an expression (52) and corresponding to the standard deviation $\sigma_d(X)$, and a scaling factor $\beta$ represented by an expression (53) and corresponding to the batch mean $\mu_d(X)$.

[Math. 51]

$$y_{b,d,n} = \gamma_d \frac{x_{b,d,n} - \mu_d(X)}{\sigma_d(X)} + \beta_d \tag{51}$$

[Math. 52]

$$\gamma = [\gamma_1, \ldots, \gamma_D] \tag{52}$$

[Math. 53]

$$\beta = [\beta_1, \ldots, \beta_D] \tag{53}$$

Here, when a concept of normalization depending on the first domain or the second domain is applied to batch normalization, the batch normalization depends on an index and is therefore represented by a following expression (54).

[Math. 54]

$$Y^{(k)}=B^k(X^{(k)}) \tag{54}$$

The batch normalization represented by the expression (54) corresponds to executing an arithmetic operation represented by a following expression (55) for each element. The expression (55) includes a batch mean $\mu_d(X^{(k)})$ of a d-th channel, and a standard deviation $\sigma_d(X^{(k)})$ and a standard deviation $\sigma_d(X^{(k)})$ of the d-th channel. Moreover, the expression (56) includes a shift amount $\gamma^k$ represented by an expression (57) and corresponding to the standard deviation $\sigma_d(X^{(k)})$, and a scaling factor $\beta^k$ represented by an expression (53) and corresponding to the batch mean $\mu_d(X^{(k)})$.

[Math. 55]

$$y_{b,d,n}^{(k)} = \gamma_d^k \frac{x_{b,d,n}^{(k)} - \mu_d(X^{(k)})}{\sigma_d(X^{(k)})} + \beta_d^k \tag{55}$$

[Math. 56]

$$\gamma^k = [\gamma_1^k, \ldots, \gamma_D^k] \tag{56}$$

[Math. 57]

$$\beta^k = [\beta_1^k, \ldots, \beta_D^k] \tag{57}$$

Note that the networks included in the conversion learning device 3 and the conversion device 30 may include a layer that performs weight normalization or layer normalization, as mentioned above.

In the above description, a case is assumed in which the first domain inputted into the conversion learning device 3 and the conversion device 30 is already known. However, the first domain may be unknown. In such a case, the conversion learning device 3 and the conversion device 30 are devices that perform many-to-one conversion, and the source encoding unit 31 receives, as input, only the feature amount sequence $X^{(k)}$ of the first domain, as represented by a following expression (58).

[Math. 58]

$$(K^{(k)}, V^{(k)})=\mathrm{SrcEnc}(X^{(k)}) \tag{58}$$

When the conversion device 30 performs conversion in real time in the inference phase, the learning execution unit 40 causes the source encoding unit 31 to learn under a constraint that the feature amount sequence $X^{(k)}$ of the first domain that is inputted into the source encoding unit 31 before a location at which the feature amount sequence $X^{(k)}$ of the first domain is to be converted into the first internal representation vector sequence $Z^{(k)}$, is converted into the first internal representation vector sequence $Z^{(k)}$.

Figure 9:
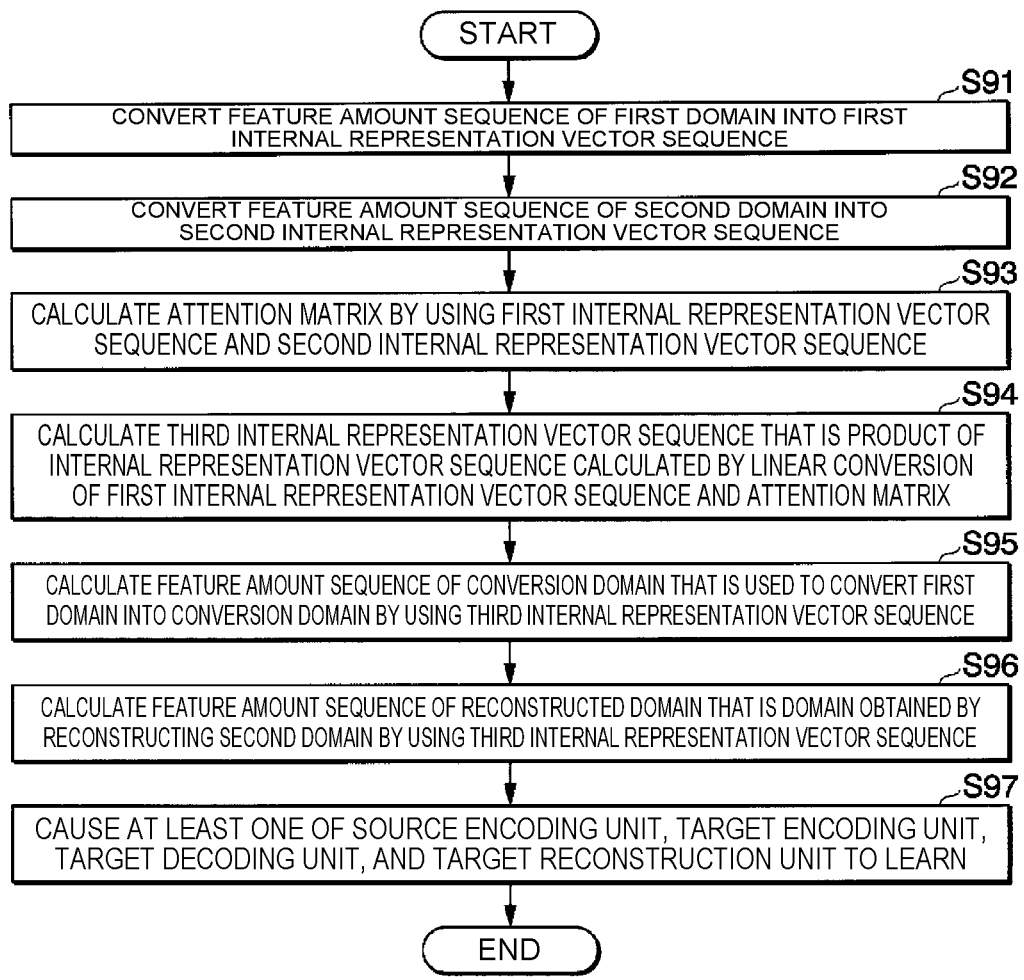
FIG. 9 is a flowchart showing an example of processing performed in a learning phase by the conversion learning device according to the second embodiment.

Next, an example of processing performed in the learning phase by the conversion learning device 3 will be described with reference to FIG. 9. FIG. 9 is a flowchart showing an example of the processing performed in the learning phase by the conversion learning device according to the second embodiment. Note that the processing shown in FIG. 9 is performed each time a pair of a first domain and a second domain are inputted into the conversion learning device 3.

In step S91, the source encoding unit 31 converts a feature amount sequence $X^{(k)}$ of a first domain into a first internal representation vector sequence $Z^{(k)}$.

In step S92, the target encoding unit 32 converts a feature amount sequence $X^{(k')}$ of a second domain into a second internal representation vector sequence $Q^{(k')}$.

In step S93, the attention matrix calculation unit 33 calculates an attention matrix $A^{(k,k')}$ by using the first internal representation vector sequence $Z^{(k)}$ and the second internal representation vector sequence $Q^{(k')}$.

In step S94, the attention matrix calculation unit 33 calculates a third internal representation vector sequence $R^{(k,k')}$, which is a product of an internal representation vector sequence $V_h^{(k)}$ calculated by linear conversion of the first internal representation vector sequence $Z^{(k)}$ and the attention matrix $A^{(k,k')}$.

In step S95, the target decoding unit 34 calculates a feature amount sequence $F^{(k,k')}$ of a conversion domain that is used to convert the first domain into the conversion domain by using the third internal representation vector sequence $R^{(k,k')}$.

In step S96, the target reconstruction unit 35 calculates a feature amount sequence $J^{(k,k')}$ of a reconstructed domain, which is a domain obtained by reconstructing the second domain by using the third internal representation vector sequence $R^{(k,k')}$.

In step S97, the learning execution unit 40 causes at least one of the source encoding unit 31, the target encoding unit 32, the target decoding unit 34, and the target reconstruction unit 35 to learn.

Note that the conversion learning device 3 may interchange order of step S91 and step S92. The conversion learning device 3 may interchange order of step S95 and step S96.

Figure 10:
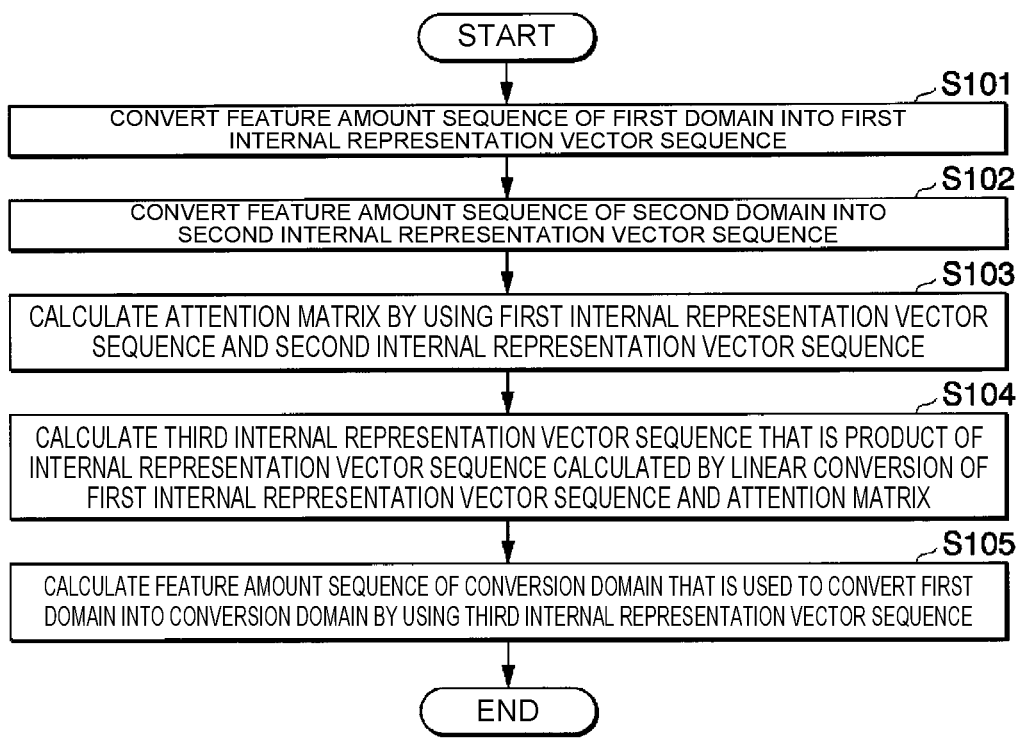
FIG. 10 is a flowchart showing an example of processing performed in an inference phase by a conversion device according to the second embodiment.

Next, an example of processing performed in the inference phase by the conversion device 30 will be described with reference to FIG. 10. FIG. 10 is a flowchart showing an example of the processing performed in the inference phase by the conversion device according to the second embodiment.

In step S101, the source encoding unit 31 converts a feature amount sequence $X^{(k)}$ of a first domain into a first internal representation vector sequence $Z^{(k)}$.

In step S102, the target encoding unit 32 converts a feature amount sequence $X^{(k')}$ of a second domain into a second internal representation vector sequence $Q^{(k')}$.

In step S103, the attention matrix calculation unit 33 calculates an attention matrix $A^{(k,k')}$ by using the first internal representation vector sequence $Z^{(k)}$ and the second internal representation vector sequence $Q^{(k')}$.

In step S104, the attention matrix calculation unit 33 calculates a third internal representation vector sequence $R^{(k,k')}$, which is a product of an internal representation vector sequence $V_h^{(k)}$ calculated by linear conversion of the first internal representation vector sequence $Z^{(k)}$ and the attention matrix $A^{(k,k')}$.

In step S105, the target decoding unit 34 calculates a feature amount sequence $F^{(k,k')}$ of a conversion domain that is used to convert the first domain into the conversion domain by using the third internal representation vector sequence $R^{(k,k')}$.

Note that the conversion device 30 may interchange order of step S101 and step S102.

Next, the convolutional layers will be described with reference to expressions (59) to (65). When inputs are represented by an expression (59) and outputs are represented by an expression (60), the convolutional layers are represented by an expression (61) including a linear conversion L and an expression (62) including a non-linear conversion f. The non-linear conversion f is, for example, a sigmoid function, a rectified linear function, or a gated linear function.

[Math. 59]
$$X \in \mathbb{R}^{D \times N} \quad (59)$$

[Math. 60]
$$Y \in \mathbb{R}^{D \times N} \quad (60)$$

[Math. 61]
$$X' = L(X) \quad (61)$$

[Math. 62]
$$Y = f(X') \quad (62)$$

Moreover, the linear conversion L with a causality-related constraint is represented, when expressed element by element, by a following expression (63) including a convolutional kernel size N'.

[Math. 63]
$$x'_{d',n'} = \sum_{d=1}^{D} \sum_{n=-N'+1}^{0} w_{d',d,n} x_{d,n+n'} + b_{d'} \ (n' = 1, \ldots, N, d' = 1, \ldots, D') \quad (63)$$

Parameters to be learned by the layer are coefficients "W" and "b" of the linear conversion L, which are represented by following expressions (64) and (65), respectively.

[Math. 64]
$$w = \{\omega_{d',d,n}\}_{D' \times D \times N'} \quad (64)$$

[Math. 65]
$$b = \{b_{d'}\}_{D'} \quad (65)$$

Next, the self-attention layers will be described with reference to expressions (66) to (70). When inputs are represented by the expression (59) and outputs are represented by the expression (60), the self-attention layers are represented by following expressions (66) to (68).

[Math. 66]
$$(Q,K,V) = L(X) \quad (66)$$

[Math. 67]
$$A = \mathrm{softmax}_n(M + K^T Q / \sqrt{D'}) \quad (67)$$

[Math. 68]
$$Y = VA \quad (68)$$

The expressions (63) to (68) represent the following processing. First, an internal representation vector sequence Q, an internal representation vector sequence K, and an internal representation vector sequence V represented by a following expression (69) are generated by linear conversion of an input X from the number D of channels into the number 3D' of channels, for example, convolution with a kernel size of one. Next, a self-similarity matrix A between the internal representation vector sequence Q and the internal representation vector sequence K is calculated. Then, the outputs Y are calculated by using the expression (68).

[Math. 69]
$$Q, K, V \in \mathbb{R}^{D' \times N} \quad (69)$$

Note that a matrix M included in the expression (67) is a matrix in which all elements are zero when a causality-related constraint is not taken into consideration, and is a matrix in which an (m, n) element is represented by a following expression (70) when a causality-related constraint is taken into consideration.

[Math. 70]
$$m_{n,n'} = \begin{cases} 0 & (n \leq n') \\ -\infty & (n > n') \end{cases} \quad (70)$$

Next, the multi-self-attention layers will be described with reference to expressions (71) to (78). When inputs are represented by the expression (59) and outputs are represented by the expression (60), the multi-self-attention layers execute arithmetic operations represented by following expressions (71) to (78). The expression (71) includes a linear conversion $L_1$. The expression (78) includes a linear conversion $L_2$.

[Math. 71]
$$(Q,K,V) = L_1(X) \quad (71)$$

[Math. 72]
$$(Q_1, \ldots, Q_H) = \mathrm{split}(Q) \quad (72)$$

[Math. 73]
$$(K_1, \ldots, K_H) = \mathrm{split}(K) \quad (73)$$

[Math. 74]

$$(V_1, \ldots, V_H) = \text{split}(V) \quad (74)$$

[Math. 75]

$$A_h = \text{softmax}_n(M + K_h^T Q_h / \sqrt{D})(h=1, \ldots, H) \quad (75)$$

[Math. 76]

$$Y_h = V_h A_h (h=1, \ldots, H) \quad (76)$$

[Math. 77]

$$C = \text{concat}(Y_1, \ldots, Y_H) \quad (77)$$

[Math. 78]

$$Y = t_2(C) \quad (78)$$

The conversion learning device 3 and the conversion device 30 according to the second embodiment have been described hereinabove. The conversion learning device 3 converts a feature amount sequence $X^{(k)}$ of a first domain assigned a first index k into a first internal representation vector sequence $Z^{(k)}$ by using the first machine learning model. The conversion learning device 3 converts a feature amount sequence $X^{(k')}$ of a second domain assigned a second index k' into a second internal representation vector sequence $Q^{(k')}$ by using the second machine learning model. The conversion learning device 3 next calculates an attention matrix $A^{(k,k')}$ by using the first internal representation vector sequence $Z^{(k)}$ and the second internal representation vector sequence $Q^{(k')}$, and the conversion learning device 3 calculates a third internal representation vector sequence $R^{(k,k')}$, which is a product of an internal representation vector sequence $V^{(k)}$ calculated by linear conversion of the first internal representation vector sequence $Z^{(k)}$ and the attention matrix $A^{(k,k')}$. The conversion learning device 3 then calculates, by using the third internal representation vector sequence $R^{(k,k')}$, a feature amount sequence $I^{(k,k')}$ of a conversion domain that is used to convert the first domain into the conversion domain, by using the third machine learning model. The conversion learning device 3 causes at least one of the target encoding unit 32 and the target decoding unit 34 to learn such that the distance between a submatrix of the feature amount sequence $X^{(k)}$ of the first domain and a submatrix of the feature amount sequence $I^{(k,k')}$ of the conversion domain becomes shorter.

Thus, the conversion learning device 3 can generate learning models that enable conversion between a plurality of domains with a single network set. Moreover, thus, the conversion learning device 3 can make it possible to perform effective conversion processing using the learning models. Furthermore, when the content data is speech data, the conversion learning device 3 can make it possible to perform effective conversion processing including a prosodic feature.

The conversion learning device 3 calculates, by using the third internal representation vector sequence $R^{(k,k')}$, a feature amount sequence $J^{(k,k')}$ of a reconstructed domain, which is a domain obtained by reconstructing the second domain, by using the fourth machine learning model. Then, the conversion learning device 3 causes at least one of the target encoding unit 32 and the target decoding unit 34 to learn such that the distance between the feature amount sequence $X^{(k')}$ of the second domain and the feature amount sequence $J^{(k,k')}$ of the reconstructed domain becomes shorter. Thus, the conversion learning device 3 can make it possible for the conversion device 30 to output a more stable result of inference.

The conversion learning device 3 causes at least one of the target encoding unit 32 and the target decoding unit 34 to learn such that non-diagonal components of the attention matrix $A^{(k,k')}$ become smaller. Thus, the conversion learning device 3 can perform learning that is based on a premise that a spoken sentence in the content data including the first domain matches a spoken sentence of the content data including the second domain, and can make it possible for the conversion device 30 to output a more stable result of inference.

The conversion learning device 3 causes at least one of the target encoding unit 32 and the target decoding unit 34 to learn such that the number of orthogonal column vectors included in the attention matrix $A^{(k,k')}$ becomes larger. Thus, the conversion learning device 3 can perform learning that is based on a premise that each location of the feature amount sequence $X^{(k)}$ of the first domain and each location of the feature amount sequence $X^{(k')}$ of the target domain largely correspond to each other, and can make it possible for the conversion device 30 to output a more stable result of inference.

In the conversion learning device 3, the source encoding unit 31 includes a neural network including a layer that performs normalization, weight normalization, or layer normalization, depending on the first domain. The target encoding unit 32 includes a neural network including a layer that performs normalization, weight normalization, or layer normalization, depending on the second domain. Similarly, the target decoding unit 34 includes a neural network including a layer that performs normalization, weight normalization, or layer normalization, depending on the first domain. The target reconstruction unit 35 includes a neural network including a layer that performs normalization, weight normalization, or layer normalization, depending on the second domain. Thus, the conversion learning device 3 makes it possible to perform normalization, weight normalization, or layer normalization, and can reduce a possibility that accuracy of a result of inference decreases in the inference phase.

The conversion learning device 3 causes the source encoding unit 31 to learn under a constraint that the feature amount sequence $X^{(k)}$ of the first domain inputted into the source encoding unit 31 before a location at which the feature amount sequence $X^{(k)}$ of the first domain is to be converted into the first internal representation vector sequence $Z^{(k)}$, is converted into the first internal representation vector sequence $Z^{(k)}$. Thus, the conversion learning device 3 makes it possible for the conversion device 30 to perform conversion processing online in real time.

Next, specific examples of effects brought about by the conversion learning device 3 and the conversion device 30 according to the second embodiment will be described with reference to FIGS. 11 to 16. In the description of the effects, all of the source encoding unit 31, the target encoding unit 32, the target decoding unit 34, and the target reconstruction unit 35 include convolutional layers.

Moreover, for an acoustic feature amount vector, a combined form of a mel-cepstral coefficient, a logarithmic basic frequency pattern, an aperiodicity index, and a voiced/unvoiced indicator is used. The voiced/unvoiced indicator is "1" in a voiced segment, and is "0" in an unvoiced segment.

For an evaluation index, the mel-cepstral distortion (MCD) is used. Assuming that a mel-cepstral coefficient for the target domain and a mel-cepstral coefficient for the conversion domain are represented by the above-mentioned expressions (27) and (28), respectively, the mel-cepstral distortion is expressed as in the above-mentioned expression (29).

Figure 11:
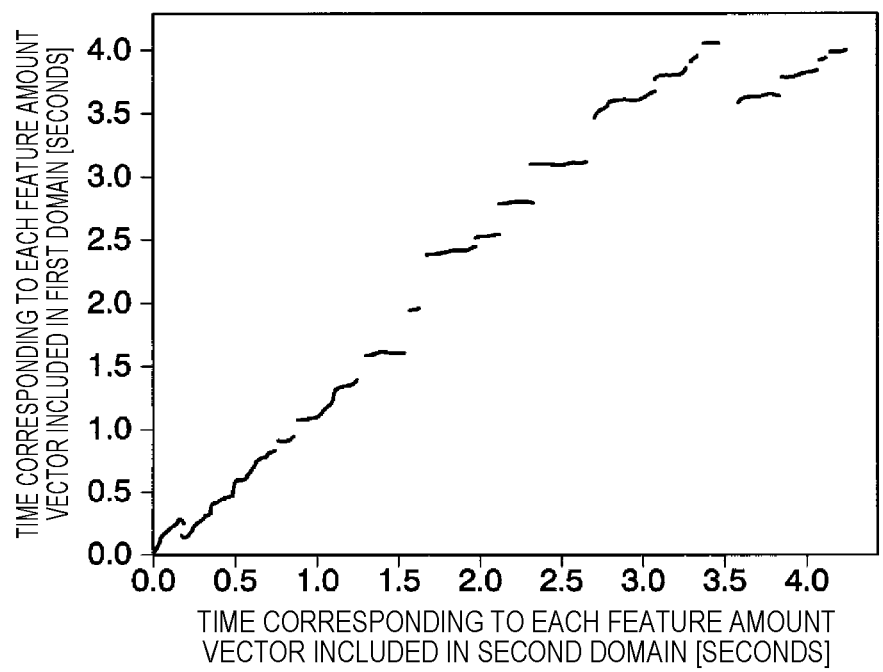
FIG. 11 shows an example of an attention matrix in a case where a source encoding unit, a target encoding unit, a target decoding unit, and a target reconstruction unit according to the second embodiment have regular batch normalization layers in the inference phase.

FIG. 11 shows an example of an attention matrix in a case where the source encoding unit, the target encoding unit, the target decoding unit, and the target reconstruction unit according to the second embodiment have regular batch normalization layers in the inference phase. In FIG. 11, a horizontal axis represents time points corresponding to feature amount vectors included in the target domain, and a vertical axis represents time points corresponding to feature amount vectors included in the source domain. Referring to FIG. 11, it can be understood that the peak of the distribution of attention locations gradually become unclear. This is due to use of the regular batch normalization layers. Note that when the content data is speech data, the attention locations are attention time points.

Figure 12:
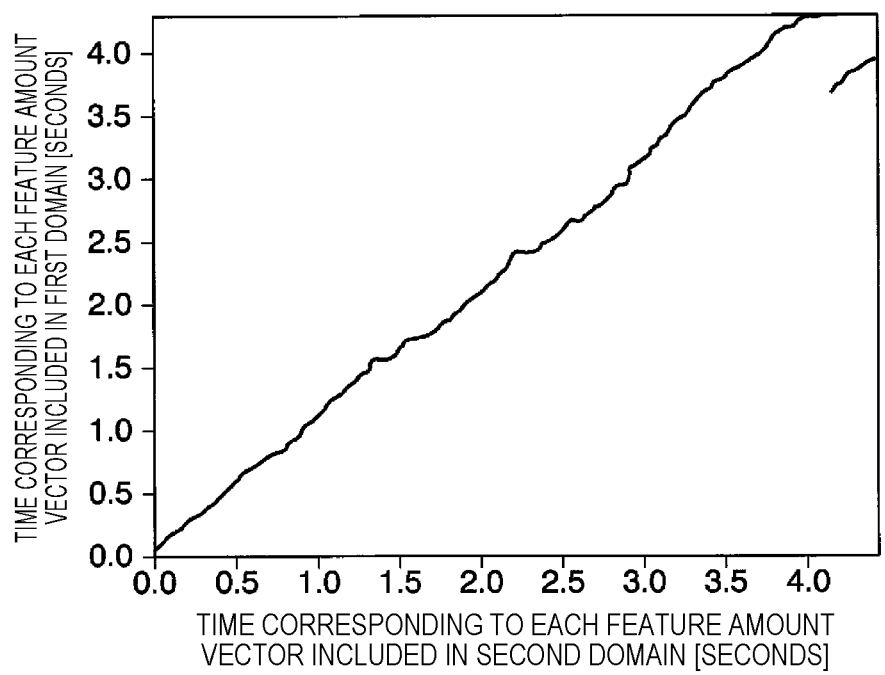
FIG. 12 shows an example of an attention matrix in a case where the source encoding unit, the target encoding unit, the target decoding unit, and the target reconstruction unit according to the second embodiment have batch normalization layers depending on a first domain or a second domain in the inference phase.

FIG. 12 shows an example of an attention matrix in a case where the source encoding unit, the target encoding unit, the target decoding unit, and the target reconstruction unit according to the second embodiment have batch normalization layers depending on a first domain or a second domain in the inference phase. In FIG. 12, a horizontal axis represents time points corresponding to feature amount vectors included in the target domain, and a vertical axis represents time points corresponding to feature amount vectors included in the source domain. Referring to FIG. 12, it can be understood that the peak of the distribution of attention locations changes monotonically and continuously. This is due to use of the batch normalization layers depending on the first domain or the second domain.

FIG. 13 shows examples of mel-cepstral coefficients in cases where the conversion device according to the second embodiment performs one-to-one conversion, and performs many-to-one conversion in the inference phase. In FIG. 13, a third column from the left shows mel-cepstral distortions in the case where one-to-one conversion is performed, and a fourth column from the left shows mel-cepstral distortions in the case where many-to-one conversion is performed. The many-to-one conversion does not require information on inputs and is therefore advantageous in practical scenarios, but accuracy in conversion can decrease. In light of such an aspect, it can be understood that when performing the many-to-one conversion, the conversion learning device 3 and the conversion device 30 can also demonstrate approximately as high performance as in the case of performing the one-to-one conversion.

FIG. 14 shows examples of mel-cepstral coefficients in cases where the conversion device according to the second embodiment performs batch conversion, and performs real-time conversion in the inference phase. In FIG. 14, a third column from the left shows mel-cepstral distortions in the case where batch processing is performed, and a fourth column from the left shows mel-cepstral distortions in the case where real-time processing is performed. When the two columns are compared, it can be understood that when performing real-time processing, the conversion learning device 3 and the conversion device 30 can also demonstrate approximately as high performance as in the case of performing batch processing.

FIG. 15 shows examples of mel-cepstral coefficients in cases where each of the conversion device according to the first embodiment and the conversion device according to the second embodiment performs conversion without taking into consideration any of the context preservation loss and the orthogonal attention loss, performs conversion taking only the orthogonal attention loss into consideration, and performs conversion taking only the context preservation loss into consideration.

In FIG. 15, third, fourth, and fifth columns from the left show mel-cepstral coefficients in the cases of conversion processing by the conversion learning device 1 and the conversion device 10 according to the first embodiment. Sixth, seventh, and eighth columns from the left of FIG. 15 show mel-cepstral coefficients in the cases of conversion processing by the conversion learning device 3 and the conversion device 30 according to the second embodiment. Moreover, the third and sixth columns from the left of FIG. 15 show the mel-cepstral coefficients in the case where neither the context preservation loss nor the orthogonal attention loss are taken into consideration. The fourth and seventh columns from the left of FIG. 15 show the mel-cepstral coefficients in the case where only the context preservation loss is taken into consideration. The fifth and eighth columns from the left of FIG. 15 show the mel-cepstral coefficients in the case where only the context preservation loss is taken into consideration.

Referring to FIG. 15, it can be understood that as more learning losses are taken into consideration, both pairs of the conversion learning device 1 and the conversion device 10 and of the conversion learning device 3 and the conversion device 30 achieve higher accuracy in conversion.

FIG. 16 shows examples of mel-cepstral coefficients in cases of conventional conversion devices, the conversion device according to the first embodiment, and the conversion device according to the second embodiment. In FIG. 16, a third column from the left shows mel-cepstral coefficients in a case of conversion processing based on "sproket", which is a conventional technique. A fourth column from the left of FIG. 16 shows mel-cepstral coefficients in a case of conversion processing based on sequence conversion using a recurrent neural network (RNN). A fifth column from the left of FIG. 16 shows mel-cepstral coefficients in a case of conversion processing by the conversion device 10 according to the first embodiment. A sixth column from the left of FIG. 16 shows mel-cepstral coefficients in a case of conversion processing by the conversion device 30 according to the second embodiment.

Referring to FIG. 16, it can be understood that both the conversion device 10 and the conversion device 30 can achieve conversion with higher accuracy than "sproket". Moreover, referring to FIG. 16, it can be understood that the conversion device 10 can perform conversion processing with an equivalent degree of accuracy to the conversion processing based on the sequence conversion using the recurrent neural network. Further, considering a fact that the conversion device 10 and the conversion device 30 took approximately one day for learning while the conversion learning device using the recurrent neural network required approximately one week for learning, it can be understood that the conversion device 10 and the conversion device 30 bring about a higher effect than the conventional technique.

Although the description is given in the first and second embodiments by taking a case, as an example, where the content data is speech data, such a case does not constitute a limit. The content data may be, for example, still image data or moving image data. However, when the content data is still image data, the above-mentioned locations are locations on spatial coordinates on a still image, for example, locations of pixels included in the still image. When the content data is moving image data, and when attention is drawn to a still image corresponding to a specific time point in the moving image, the above-mentioned locations are locations on spatial coordinates on the still image. On the other hand, when the content data is moving image data, and when attention is drawn to a specific location on spatial coordinates, for example, a specific area including at least one pixel, the above-mentioned locations are locations on a time axis, that is, time points.

At least one or some of the functions included in the conversion learning device 1, the conversion device 10, the conversion learning device 3, and the conversion device 30 may be implemented by hardware including circuitry such as large scale integration (LSI), application specific integrated circuit (ASIC), field-programmable gate array (FPGA), or graphics processing unit (GPU).

At least one or some of the functions included in the conversion learning device 1, the conversion device 10, the conversion learning device 3, and the conversion device 30 may be implemented through cooperation between such types of hardware and software.

For example, the software may be stored in a storage device including a non-transitory storage medium, and may be read and executed by the conversion learning device 1, the conversion device 10, the conversion learning device 3, and the conversion device 30. Such a storage device is, for example, a hard disk drive (HDD) or a solid state drive (SSD).

Alternatively, the software may be stored in a storage device including a removable non-transitory storage medium, and may be read and executed by the conversion learning device 1, the conversion device 10, conversion learning device 3, or the conversion device 30. Such a storage device is, for example, a DVD or a CD-ROM.

Embodiments of the present invention have been described in detail hereinabove, with reference to the drawings. However, embodiments of the present invention are not limited to the above-described embodiments, and at least one of various modifications, substitutions, and changes in design may be made within a scope that does not depart from the gist of the present invention.

REFERENCE SIGNS LIST 1, 3 Conversion learning device
10, 30 Conversion device
11, 31 Source encoding unit
12, 32 Target encoding unit
13, 33 Attention matrix calculation unit
14, 34 Target decoding unit
15, 35 Target reconstruction unit
16 Forward attention correction execution unit
P, Q Processing block

The invention claimed is:

1. A conversion learning device comprising:
a processor; and
a storage medium having computer program instructions stored thereon, when executed by the processor, perform to:
    convert, by using a first machine learning model, a feature amount sequence of a source domain that is a characteristic of conversion-source content data of speech, into a first internal representation vector sequence that is a matrix in which internal representation vectors at individual locations of the feature amount sequence of the source domain are arranged;
    convert, by using a second machine learning model, a feature amount sequence of a target domain that is a characteristic of conversion-target content data of speech, into a second internal representation vector sequence that is a matrix in which internal representation vectors at individual locations of the feature amount sequence of the target domain are arranged;
    calculate, by using the first internal representation vector sequence and the second internal representation vector sequence, an attention matrix that is a matrix mapping the individual locations of the feature amount sequence of the source domain to the individual locations of the feature amount sequence of the target domain;
    calculate a third internal representation vector sequence based on a result of linear conversion of the first internal representation vector sequence and the attention matrix;
    calculate, by using the third internal representation vector sequence, a feature amount sequence of a conversion domain that is used to convert the source domain into the conversion domain, by using a third machine learning model; and
    learn such that a distance between a submatrix of the feature amount sequence of the target domain and a submatrix of the feature amount sequence of the conversion domain becomes shorter.

2. The conversion learning device according to claim 1, wherein the computer program instructions further perform to
    calculate, by using the third internal representation vector sequence, a feature amount sequence of a reconstructed target domain that is a domain obtained by reconstructing the target domain, by using a fourth machine learning model, and
    learn such that a distance between the feature amount sequence of the target domain and the feature amount sequence of the reconstructed target domain becomes shorter.

3. The conversion learning device according to claim 1, wherein the computer program instructions further perform to learn such that non-diagonal components of the attention matrix become smaller.

4. The conversion learning device according to claim 1, wherein the computer program instructions further perform to learn such that the number of orthogonal column vectors included in the attention matrix becomes larger.

5. A conversion learning device comprising:
a processor; and
a storage medium having computer program instructions stored thereon, when executed by the processor, perform to:
    convert, by using a first machine learning model, a feature amount sequence of a first domain that is a characteristic of conversion-source content data of speech and is assigned a first index, into a first internal representation vector sequence that is a matrix in which internal representation vectors at individual locations of the feature amount sequence of the first domain are arranged;
    convert, by using a second machine learning model, a feature amount sequence of a second domain that is a characteristic of conversion-target content data of speech and is assigned a second index that is different from the first index, into a second internal representation vector sequence that is a matrix in which internal representation vectors at individual locations of the feature amount sequence of the second domain are arranged;
    calculate, by using the first internal representation vector sequence and the second internal representation vector sequence, an attention matrix that is a matrix mapping the individual locations of the feature amount sequence of the first domain to the individual locations of the feature amount sequence of the second domain, and calculate a third internal representation vector sequence based on a result linear conversion of the first internal representation vector sequence and the attention matrix;

calculate, by using the third internal representation vector sequence, a feature amount sequence of a conversion domain that is used to convert the first domain into the conversion domain, by using a third machine learning model; and learn such that a distance between a submatrix of the feature amount sequence of the second domain and a submatrix of the feature amount sequence of the conversion domain becomes shorter.

6. The conversion learning device according to claim 5, wherein the computer program instructions further perform to calculate, by using the third internal representation vector sequence, a feature amount sequence of a reconstructed domain that is a domain obtained by reconstructing the second domain, by using a fourth machine learning model, learn such that a distance between the feature amount sequence of the second domain and the feature amount sequence of the reconstructed domain becomes shorter.

7. The conversion learning device according to claim 5, wherein learn such that non-diagonal components of the attention matrix become smaller.

8. A conversion learning method comprising:

a source encoding step of converting, by using a first machine learning model, a feature amount sequence of speech of a source domain that is a conversion source, into a first internal representation vector sequence that is a matrix in which internal representation vectors at individual locations of the feature amount sequence of the source domain are arranged;

a target encoding step of converting, by using a second machine learning model, a feature amount sequence of a target domain that is a conversion target, into a second internal representation vector sequence that is a matrix in which internal representation vectors at individual locations of the feature amount sequence of the target domain are arranged;

an attention matrix calculation step of calculating, by using the first internal representation vector sequence and the second internal representation vector sequence, an attention matrix that is a matrix mapping the individual locations of the feature amount sequence of the source domain to the individual locations of the feature amount sequence of the target domain, and calculating a third internal representation vector sequence based on a result of linear conversion of the first internal representation vector sequence and the attention matrix;

a target decoding step of calculating, by using the third internal representation vector sequence, a feature amount sequence of a conversion domain that is used to convert the source domain into the conversion domain, by using a third machine learning model; and a learning execution step of causing at least one of a target encoding unit including the first machine learning model and a target decoding unit including the second machine learning model to learn such that a distance between a submatrix of the feature amount sequence of the target domain and a submatrix of the feature amount sequence of the conversion domain becomes shorter.

* * * * *